(12) United States Patent
Mohammed

(10) Patent No.: US 11,657,462 B2
(45) Date of Patent: May 23, 2023

(54) METHODS AND SYSTEMS FOR ESTABLISHING AND OPERATING A MULTI-FUNCTIONAL PRIVATE SOCIAL NETWORK WITH DIGITAL WILL

(71) Applicant: CircleIt LLC, Chicago, IL (US)

(72) Inventor: Hanan S. Mohammed, Chicago, IL (US)

(73) Assignee: CircleIt LLC, Chicago, IL (US)

( * ) Notice: Subject to any disclaimer, the term of this patent is extended or adjusted under 35 U.S.C. 154(b) by 0 days.

(21) Appl. No.: 17/072,698

(22) Filed: Oct. 16, 2020

(65) Prior Publication Data

US 2022/0122190 A1 Apr. 21, 2022

(51) Int. Cl.
*G06Q 50/00* (2012.01)
*H04L 51/08* (2022.01)
*H04L 51/52* (2022.01)
*H04L 51/214* (2022.01)

(52) U.S. Cl.
CPC ............ *G06Q 50/01* (2013.01); *H04L 51/08* (2013.01); *H04L 51/214* (2022.05); *H04L 51/52* (2022.05)

(58) Field of Classification Search
CPC ......... G06Q 50/01; H04L 51/08; H04L 51/14; H04L 51/52; H04L 51/214
USPC .......................... 709/219, 217, 226; 705/319
See application file for complete search history.

(56) References Cited

U.S. PATENT DOCUMENTS

| | | | |
|---|---|---|---|
| 2009/0125410 A1 | 5/2009 | Perlman | |
| 2010/0023341 A1 | 1/2010 | Ledbetter et al. | |
| 2013/0110982 A1* | 5/2013 | Chung | G06Q 10/10 709/219 |
| 2013/0246524 A1 | 9/2013 | Berner et al. | |
| 2013/0325976 A1* | 12/2013 | Mansfield | G06Q 50/01 709/217 |
| 2014/0337059 A1 | 11/2014 | Simon et al. | |
| 2015/0101026 A1* | 4/2015 | Kraus | H04W 4/21 726/4 |
| 2015/0212997 A1* | 7/2015 | Kassim | G06Q 50/18 715/226 |

(Continued)

OTHER PUBLICATIONS

European Search Report issued in application No. 18892724.8, dated Aug. 16, 2021.

(Continued)

*Primary Examiner* — Kaylee J Huang
(74) *Attorney, Agent, or Firm* — K&L Gates LLP

(57) ABSTRACT

The present web-based system and methods enabled by an application executable on a computing device of the system allow subscribers to develop a private circle and interactive family & friends tree within a private social network, and to schedule delivery of selected content to a designated recipient, either on a future date or upon occurrence of a future event having a date unknown to the subscriber. The system may determine a delivery date for the selected content, even if no date is specified by the subscriber, based on data obtained from other subscribers to the private circle and/or machine learning analysis, and may validate the delivery date before delivering the content. The system may enable parent subscribers to the private circle to add newborn and/or unborn children to the private circle, and may enable subscribers to prepare a digital will and integrate the will with the subscriber's account in the private circle.

5 Claims, 21 Drawing Sheets

(56) References Cited

U.S. PATENT DOCUMENTS

| | | | |
|---|---|---|---|
| 2015/0339020 A1* | 11/2015 | D'Amore | G06F 3/0484 |
| | | | 715/753 |
| 2018/0082391 A1* | 3/2018 | Brody | G06Q 20/32 |
| 2018/0108056 A1* | 4/2018 | Chikuvadze | G06Q 40/12 |
| 2018/0260924 A1* | 9/2018 | Holt | G06Q 50/186 |
| 2019/0199813 A1 | 6/2019 | Mohammed | |
| 2019/0386951 A1 | 12/2019 | Uhll | |
| 2021/0327008 A1* | 10/2021 | Salah | G06F 9/451 |

OTHER PUBLICATIONS

International Search Report and Written Opinion issued in related PCT application No. PCT/US2021/53333, dated Feb. 3, 2022.

\* cited by examiner

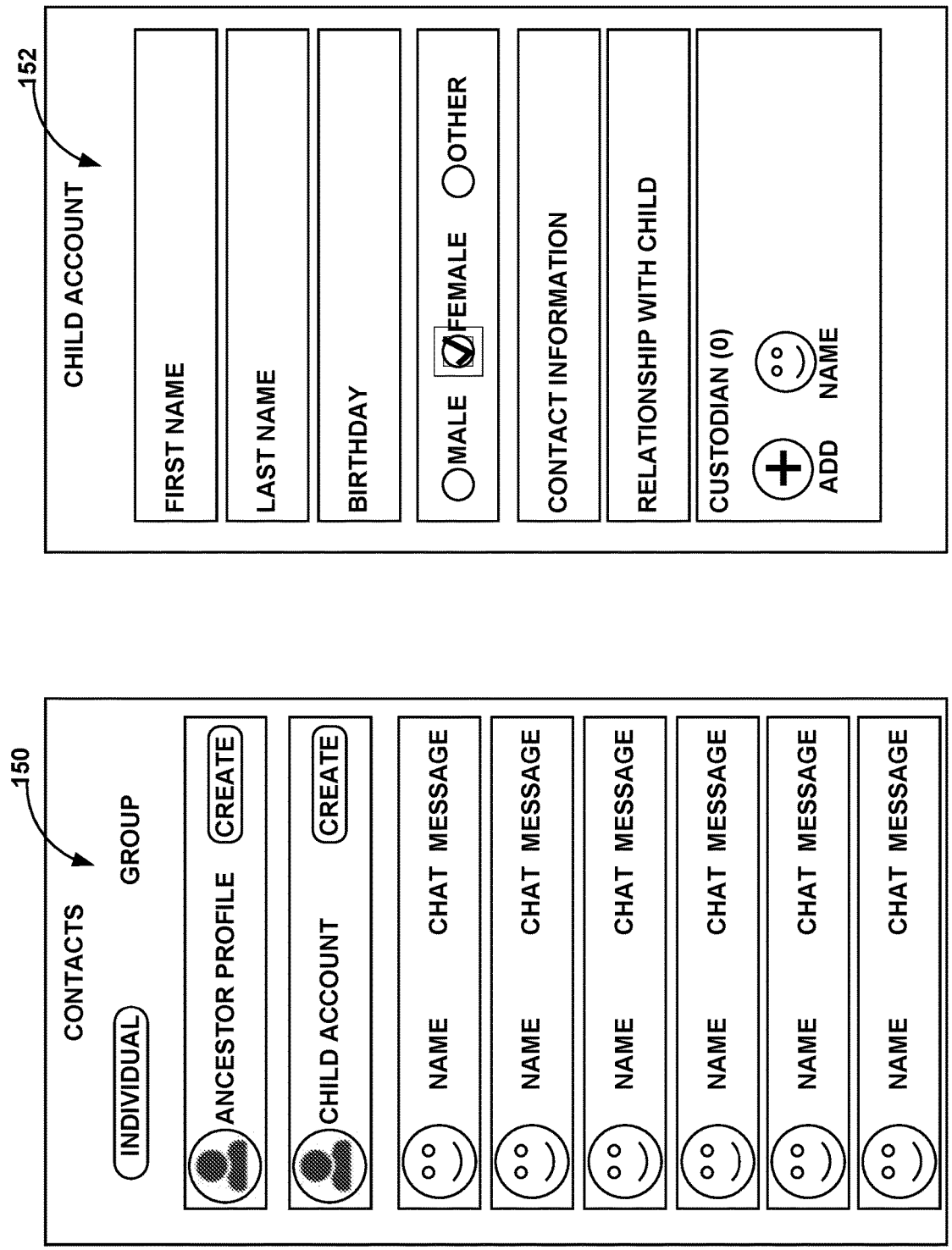

FIG. 6D

CHOOSE CUSTODIAN — 156

RECENT
- NAME
- NAME ✓

ALL CONTACTS
- NAME ✓
- NAME
- NAME ✓
- NAME

RELATIONSHIP WITH CHILD

- FATHER
- MOTHER
- BROTHER

SELECT

METHODS AND SYSTEMS FOR ESTABLISHING AND OPERATING A MULTI-FUNCTIONAL PRIVATE SOCIAL NETWORK WITH DIGITAL WILL

FIELD OF THE INVENTION

The invention relates generally to a multi-functional private social network embodied in a machine-learning enabled application that enables collaborative development of an interactive family & friends tree, targeting of specific content from a subscriber for delivery on the occurrence of a specified future event to a specified user, and integration with a subscriber's digital will.

BACKGROUND

Known social networking applications ("apps") may enable real-time messaging between existing participants and/or may provide a given participant with event notifications and/or suggestions of other existing participants with whom to connect. However, known social networking apps lack advanced features, such as machine-learning enabled features, to enable validation of a determined date for a system to deliver content from a subscriber on the occurrence of a future event to a specified recipient, regardless of whether the date of the event or recipient are personally known to the subscriber. Known social networking applications also lack features to enable collaborative development of an interactive family & friends tree and integration of a subscriber's digital will with a private circle within the network. Known social networking applications and their providers further fail to provide the security afforded by a private, self-contained social network, and do not provide safekeeping and delivery of physical content. The present invention overcomes these deficiencies and provides, inter alia, the above-referenced improvements.

BRIEF SUMMARY OF THE INVENTION

The present invention is directed generally to processes enabled by a private social network operating on a web-based system that includes an application executable on a personal computing device. A group of subscribers to the network may form a private circle, such as a circle of family and/or close friends. Some processes enabled by the private social network allow a subscriber to generate content and schedule the generated content for future delivery to a designated recipient, either one who is living or who will be born in the future. The delivery may be set to occur on a known future date, on a future milestone or event wherein the milestone start date or event occurrence date is known or not known, or on the occurrence of a future event on a date unknown to the user at the time of delivery scheduling and that may, or may not, occur. Instead of specifying a delivery date, the subscriber instead may specify that the content is to be delivered as a "smart card," for which the web-based system is configured to predict a delivery date by analyzing data gathered from other subscribers to the private circle, such as by applying machine learning algorithms to the data. The web-based system and method that allows users to send digital content also allows the user to send physical content such as flowers, gift cards, and the like to a specified user at a specified time and/or the occurrence of a specified event in the future. The physical content may include personal property held for safekeeping by a provider of the private social network, such as personal property intended to be delivered to a specified recipient upon execution of the subscriber's will. In this manner, the provider of the private social network may function as a custodian or concierge service for the subscriber's digital and physical content. The processes enabled by the private social network also allow subscribers to a private circle to validate new members and to collaboratively develop an interactive family & friends tree. The interactive family & friends tree contains information about subscribers to the private circle and/or their ancestors, and enables the subscribers to initiate the delivery of selected digital or physical content via the family & friends tree. The processes enabled by the private social network further allow subscribers to a private circle to draft a digital will, with assistance by designated legal counsel if needed, and integrate the digital will with a subscriber's account associated with the private circle.

In one embodiment, a method for scheduling automated delivery of digital content to a designated recipient at a designated future point in time comprises: providing a private social network operating on a system that comprises: a cloud-based server having a memory and programmed instructions stored therein, a plurality of computing devices in operative connection and communication with the cloud-based server, each computing device in the plurality comprising a display, a processor and a memory, wherein the computing device is configured to access the memory and programmed instructions stored in the cloud-based server and execute at least some of the programmed instructions; enabling a user to subscribe to the private social network to become a subscriber, wherein the private social network comprises other subscribers and wherein the subscribers can execute the programmed instructions using a computing device in the plurality of computing devices; wherein the system enables the subscriber to access the programmed instructions with a computing device and actuate the accessed programmed instructions to perform: establishing a private circle of some of the other subscribers to the private social network, wherein the private circle is enabled to include both current subscribers and future subscribers who are not yet born but are identified by relationship with the subscriber; creating and storing digital content at a data library located in the memory of the cloud-based server of the system; accessing, curating and/or editing the created and stored digital content; selecting a designated recipient for receiving digital content selected by the subscriber from the digital content and/or identified physical content, wherein the designated recipient is selected from the private circle and is enabled to be selected from both the current subscribers and future subscribers; selecting, by the subscriber, a future delivery triggering event that is either based on a milestone event with a known start date, or on a future event having a date of occurrence that is unknown to the subscriber at the time that the future delivery triggering event is selected by the subscriber; determining the date of occurrence of the future delivery triggering event and assigning a confidence score to the determined date of occurrence; attempting to validate the determined date of occurrence by determining whether the confidence score satisfies an auto-approval threshold value; if the confidence score satisfies the auto-approval threshold value, scheduling a delivery date for delivery of the selected digital content to the designated recipient based on the determined date of occurrence of the future delivery triggering event; and delivering the selected digital content and/or identified physical content to the designated recipient on the scheduled delivery date.

In another embodiment, a method for establishing and maintaining a digital family & friends tree comprises: providing a private social network operating on a system that comprises: a cloud-based server having a memory and programmed instructions stored therein, a plurality of computing devices in operative connection and communication with the cloud-based server, each computing device in the plurality comprising a display, a processor and a memory, wherein the computing device is configured to access the memory and programmed instructions stored in the cloud-based server and execute at least some of the programmed instructions; enabling a user to subscribe to the private social network to become a subscriber, wherein the private social network comprises other subscribers and wherein the subscribers can execute the programmed instructions using a computing device in the plurality of computing devices; wherein the subscriber accesses the programmed instructions with a computing device and actuates the accessed programmed instructions to perform: establishing a private circle comprising the subscriber and of some of the other subscribers to the private social network, wherein the private circle is enabled to include both current subscribers and future subscribers who are not yet born but are identified by relationship with the subscriber; validating, by at least two subscribers of the private circle, the identities of one or more additional subscribers to the private circle; for each of the one or more additional subscribers, after validating the identity of the additional subscriber: granting the additional subscriber access to the digital family & friends tree and adding a digital profile of the additional subscriber to the digital family & friends tree; and creating and storing digital content associated with the additional subscriber's digital profile in a data library located in the memory of the cloud-based server of the system; for each of one or more ancestors of at least one of the subscribers of the private circle: adding a digital profile of the ancestor to the digital family & friends tree; and creating and storing digital content associated with the ancestor's digital profile in a data library located in the memory of the cloud-based server of the system, wherein the digital profile of each subscriber and ancestor added to the digital family & friends tree is represented on a interactive digital map as a pin in a geographic location associated with the subscriber or ancestor.

In another embodiment, a method for establishing and maintaining a digital family & friends tree, comprising: providing a private social network operating on a system that comprises: a cloud-based server having a memory and programmed instructions stored therein, a plurality of computing devices in operative connection and communication with the cloud-based server, each computing device in the plurality comprising a display, a processor and a memory, wherein the computing device is configured to access the memory and programmed instructions stored in the cloud-based server and execute at least some of the programmed instructions; enabling a user to subscribe to the private social network to become a subscriber, wherein the private social network comprises other subscribers who can execute the programmed instructions using a computing device in the plurality of computing devices, the private social network further comprising a private circle comprising the subscriber and of some of the other subscribers to the private social network, wherein the private circle is enabled to include both current subscribers and future subscribers who are not yet born but are identified by relationship with the subscriber; wherein the subscriber accesses the programmed instructions with a computing device and actuates the accessed programmed instructions to perform: adding a newborn or unborn subscriber to the private circle; confirming that the newborn or unborn subscriber is a child of the subscriber; adding a digital profile of the newborn or unborn subscriber to a digital family & friends tree, wherein the digital family & friends tree is accessible to the other subscribers included in the private circle; creating and storing digital content associated with the newborn or unborn subscriber's digital profile in a data library located in the memory of the cloud-based server of the system; enabling the other subscribers included in the private circle to: select digital content and/or identified physical content for delivery to the newborn or unborn subscriber; and select a future delivery triggering event for sending the selected digital content for delivery to the newborn or unborn subscriber; and delivering the selected digital content and/or identified physical content to the newborn or unborn subscriber on the scheduled delivery date.

In another embodiment, a method for preparing a digital will comprises: providing a private social network operating on a system that comprises: a cloud-based server having a memory and programmed instructions stored therein, a plurality of computing devices in operative connection and communication with the cloud-based server, each computing device in the plurality comprising a display, a processor and a memory, wherein the computing device is configured to access the memory and programmed instructions stored in the cloud-based server and execute at least some of the programmed instructions; enabling a user to subscribe to the private social network to become a subscriber, wherein the private social network comprises other subscribers who can execute the programmed instructions using a computing device in the plurality of computing devices, the private social network further comprising a private circle comprising the subscriber and of some of the other subscribers to the private social network, wherein the private circle is enabled to include both current subscribers and future subscribers who are not yet born but are identified by relationship with the subscriber; wherein the subscriber accesses the programmed instructions with a computing device and actuates the accessed programmed instructions to perform: providing a digital-will building user interface; receiving information regarding one or more executors of the digital will selected by the subscriber; receiving personal information from the subscriber comprising the body of the digital will; determining whether the information regarding the one or more executors and/or the personal information comprising the body of the digital will requires attorney review; if the digital will requires attorney review, transmitting the will to a designated law firm and/or attorney for review; receiving the finalized digital will from the designated law firm and/or attorney; and storing the finalized digital will in association with the subscriber.

BRIEF DESCRIPTION OF THE DRAWINGS

FIG. 6A is an exemplary display screen showing a "contacts" page enabling a subscriber to begin the process of establishing a child's account or to add an ancestor profile to the family & friends tree, in accordance with the present invention.

FIG. 6B is an exemplary display screen showing a "child account" page enabling a subscriber to input and view information for a new child's account, in accordance with the present invention.

FIG. 6C is an exemplary display screen showing a relationship-identification page enabling a subscriber to indicate his or her relationship to child during or after creation of a new child's account, in accordance with the present invention.

FIG. 6D is an exemplary display screen showing a custodian-selection page enabling a subscriber to select custodians for the child's account during creation of the account, in accordance with the present invention.

DETAILED DESCRIPTION

Figure 1:
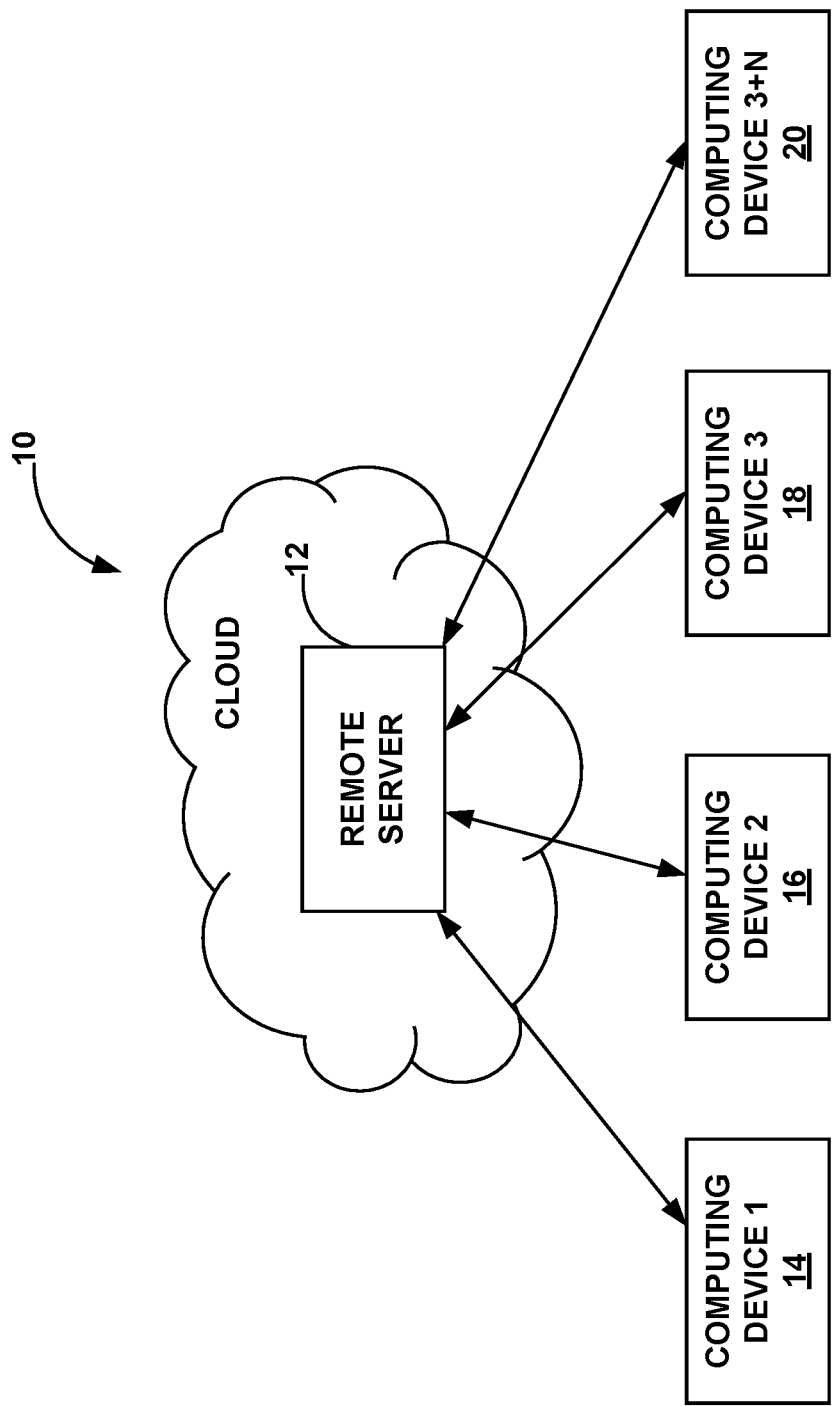
FIG. 1 is a schematic drawing of one embodiment of the present invention, illustrating a web-based platform for the system and methods described herein.

While the invention is amenable to various modifications and alternative forms, specifics thereof are shown by way of example in the drawings and described in detail herein. It should be understood, however, that the intention is not to limit the invention to the particular embodiments described. On the contrary, the intention is to cover all modifications, equivalents, and alternatives falling within the spirit and scope of the invention. Features of various embodiments may be combined with other embodiments within the contemplation of this invention. These and other variations and modifications of the embodiments disclosed herein may be made without departing from the scope and spirit of the invention.

Various embodiments of the present invention comprise a platform 10 comprising a cloud-based or otherwise remotely located server(s) 12 adapted to store information and execute algorithms in accordance with the various methods described herein. The cloud-based server(s) 12 may, as shown in FIG. 1, be in operative connection with a plurality of computing devices 1 (14), 2 (16), 3 (18), 3+N (20). Computing devices as used herein may comprise personal computers, desktop computers, smartphones, tablets and the like, all of which comprise, as the skilled artisan will recognize, a display, a data input such as a keyboard or the like, a memory in communication with the data input and adapted to store information including, but not limited to, executable program instructions, and a processor in communication with the memory, the display and the data input, the processor adapted to, inter alia, execute programmable instructions. Each computing device is adapted to connect to the remotely located server(s) by connecting with the worldwide web or internet and/or a cellular connection. Further, each computing device may be adapted to connect with each other via the internet or cellular connection as is well understood in the art. It should also be noted that the features shown on all exemplary display screens represented in the figures of the present disclosure are illustrative and non-limiting in nature; thus, the present disclosure is intended to include related arrangements, proportions, and text associated with icons and images appearing on such display screens.

The system and methods described herein generally use the platform 10 described in connection with FIG. 1. The platform of FIG. 1 is well-known to the skilled artisan and will not therefore be described further. The system and methods of the present invention is preferably operated as an application or "app" as is commonly known to the skilled artisan. The app is manifested on a subscriber's or user's computing device display as illustrated, in part and in exemplary form, in FIGS. 3-4D. The executable instructions for the app of the present method and system may be located in total or in part in the memory of the subscriber's computing device, e.g., a smartphone and/or may be located in whole or in part on the remote cloud-based server of the platform shown in FIG. 1. The various icons shown on the exemplary displays are understood to be active and, when actuated, initiate related programmable instructions.

Figure 2:
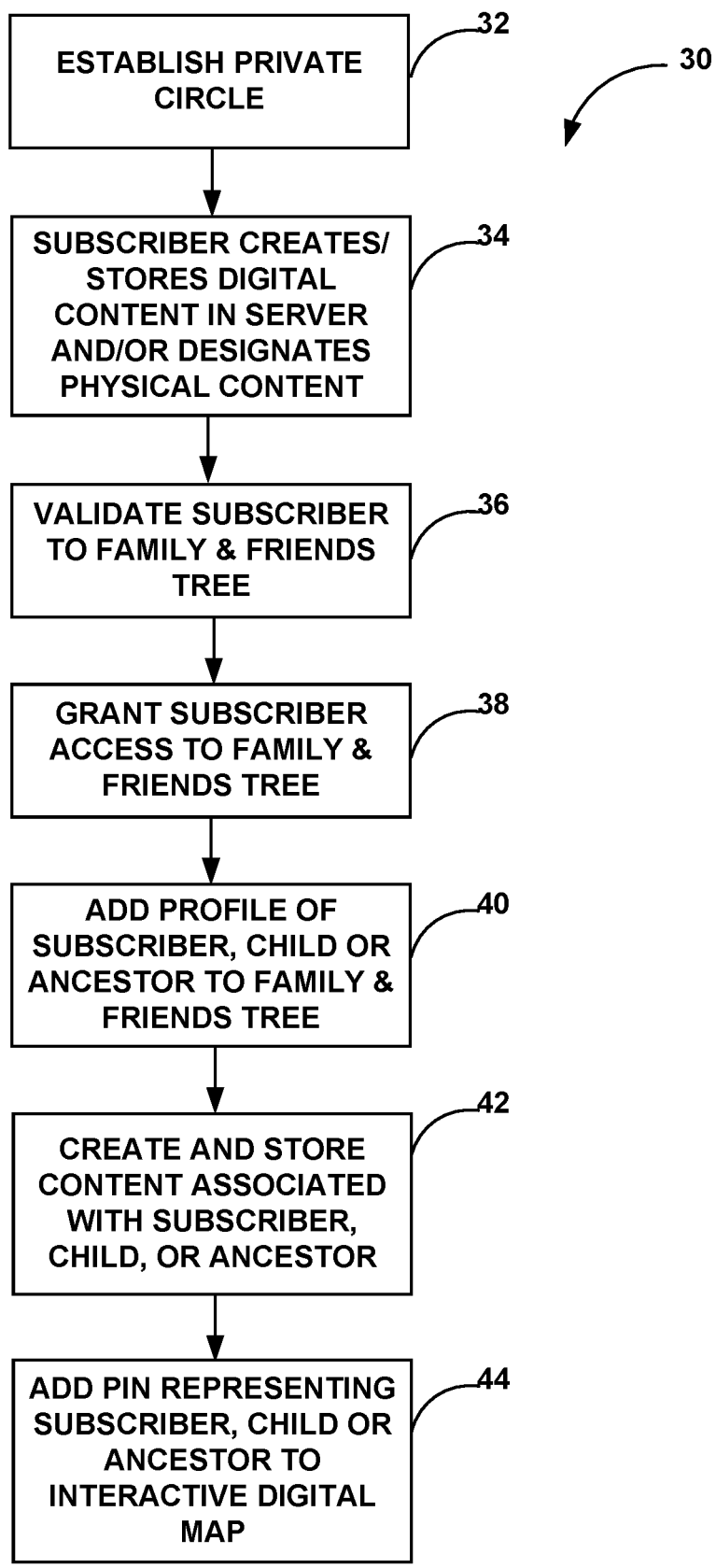
FIG. 2 is a block process flow diagram of one embodiment of the present invention by which the system of FIG. 1 enables subscribers to a establish a private circle and collaboratively build a family & friends tree.

Turning now to FIG. 2, a general process flow 30 is provided for one embodiment of the present invention by which the system enables subscribers to the private social network to establish a private circle, store and designate content, and collaboratively build a family & friends tree. It should be noted that although the members of such a family & friends tree are generally referred to herein as being relatives related by blood or marriage, the family & friends tree may also include friends that are not relatives of other members of the family & friends tree. Thus, the process begins at 32 when a user subscribes to the private social network and establishes a private circle of family members and/or friends, each of whom are also subscribers or users of the method of private social network. The subscribers to the private circle then may collaboratively build an interactive family & friends tree as further described below and with respect to FIGS. 3A-4D. Those outside the private circle are not allowed by default to see any content viewable by those in the private circle.

A subscriber may establish his or her own circle at any time at 32 or may connect with other established circles to create a network of associated circles. Still further, the subscriber may establish his or her own circle after subscribing to the private social network and then connect with other circles to create a network of associated circles.

At any point in this process, the subscriber may begin to capture and/or store digital content at 34. For example, the application interface may comprise actuable icons or buttons relating to creating and/or uploading digital content and/or identifying physical content. The digital content captured and/or stored using the application and related interface discussed herein is catalogued in the subscriber's digital library located in the cloud-based server(s) and may be accessed, viewed, curated, etc., through the application interface at any time. As defined herein, "digital content" means, for example and without limitation, video, picture, audio, SMS or other text messaging, other messaging, email, other electronic documents, and the like. This digital content may be designated or selected for delivery to a designated recipient within the circle, to all subscribers within the established circle, or to part or all of a network of associated circles, or any combination thereof, as further discussed below with respect to FIGS. 5-9.

In addition to digital content, at step 34, the subscriber may identify physical content such as flowers, candy, gifts, or other items for delivery to a designated recipient within the circle, the circle itself or part, or all, of the network of associated circles, or any combination thereof. In some examples, the physical content may include personal property held for safekeeping by a provider of the private social network, such as personal property intended to be delivered to a designated recipient upon execution of the subscriber's will. In this manner, the provider of the private social network may function as a custodian or concierge service for the subscriber's digital and physical content. Once the content is captured and/or stored or identified, the captured and stored digital content and/or a representative image of identified physical content may be viewed and/or curated at the computing device display as it is stored and organized within the subscriber's digital library.

After the private circle and subscriber's digital library have been established, one or more subscribers to the private circle may begin collaboratively building an interactive family & friends tree as shown at steps 36-44 of FIG. 2. At step 36, a subscriber to the private circle may invite one or more additional subscribers to the private circle to join the family & friends tree. Alternatively, a subscriber to the private circle may request access to the family & friends tree. Each additional subscriber's identity and relationship to existing subscribers to the private circle are then validated by at least two existing subscribers to the private circle at 38. Once validated, the additional subscriber is granted access to the family & friends tree at 38. Upon gaining access to the family & friends tree, a subscriber may create a digital profile for himself or herself within the family & friends tree at 40. Additionally, or alternatively, the subscriber may create a digital profile within the family & friends tree for a child, an ancestor who is no longer alive or who otherwise cannot create his or her own profile, or even pet. In the case of an ancestor, other subscribers having access to the family & friends tree can collaboratively help build the ancestor's digital profile within the family & friends tree.

Creating the subscriber's or ancestor's digital profile may include creating and storing digital content associated with that subscriber or ancestor to the system's digital library. Types of digital content that may be included in a subscriber's or ancestor's digital profile within the family & friends tree are described and illustrated further with respect to FIGS. 3A and 4A-4D. One aspect of the family & friends tree may be visually presented as an interactive geographic map. For each member of the family & friends tree, a pin representing the member will appear on the geographic map in a (44). A private circle's family & friends tree may be developed and maintained as it grows or changes through births, marriages, deaths, etc. by repeating one or more of the steps of FIG. 2.

Figure 3A:
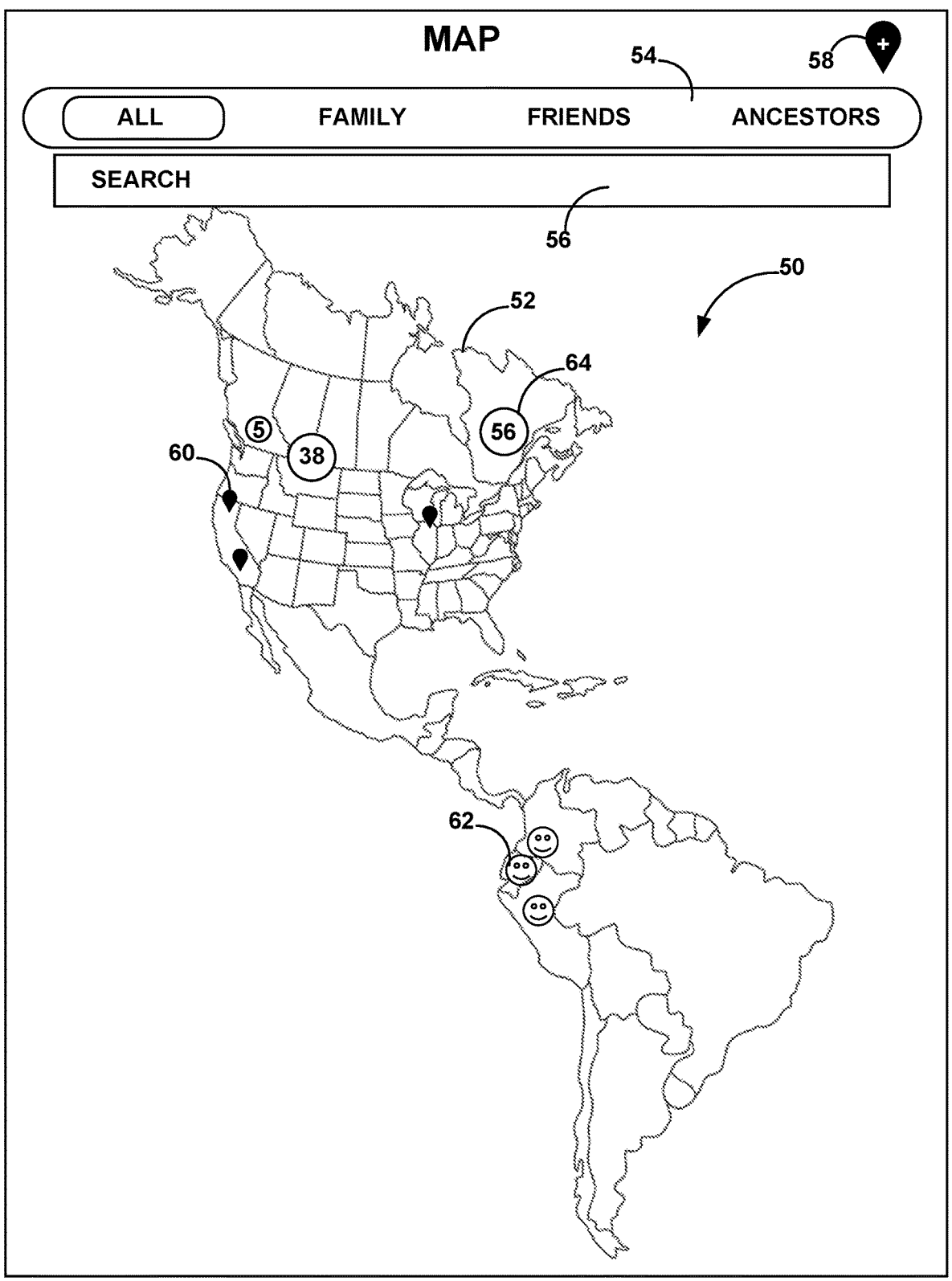
FIG. 3A is an exemplary display screen of one embodiment of an interactive family-tree map, in accordance with the present invention.

FIG. 3A is an exemplary display screen 50 of one embodiment of an aspect of the interactive family-tree map 52 of the present invention. The interactive family-tree map 52 may be embodied in an application running on a subscriber's personal computing device, such as a smartphone. In the illustrated example, the family-tree map 52 includes a geographic map of North America and South America, but a family-tree map may include a geographic map of a different and/or larger or smaller region of the globe, depending on which geographic region(s) are associated with members of the family & friends tree. The exemplary display screen further includes a filter tool 54 by which a user can select subsets of family & friends tree members to view, a search tool 56 by which a subscriber can search for a specific family & friends tree member, and an add-pin tool 58 by which a subscriber can add a new pin for a family & friends tree member. As shown in FIG. 3A, family & friends tree members are indicated on the map 52 by a pin icon 60. Members may also add pin icons 60 to the map to indicate a location having significance to the family and/or one of its members, such as birthplace or burial place of a member. Members may also be depicted on the map 52 via thumbnail pictures 62. In some embodiments, the map 52 may include numeric indicator(s) 64, which may represent a number of family members within a region of the map 52, such as in a particular country, state, province, or city. A subscriber may zoom in or out of a region of the map 52 to view a greater or lesser level of detail of the region and information associated with the pins 60.

From the map 52 (or a contacts list), a subscriber may select a member of the family & friends tree to view basic information (e.g., current location, hometown, contact information, occupation, etc.) about that member or to view that member's full digital profile on the family & friends tree. FIGS. 4A-4D illustrate exemplary display screens of a full digital profile of a family & friends tree member, including a "snapshot" page, a "my story" page, a "gallery" page, and an "ask me" page. In some embodiments, a generational key to the family & friends tree may be provided to future users, e.g., unborn users and/or users who are added by marriage or the like in the future, so they can unlock the digital profiles of members of the family & friends tree, some of whom may no longer be living. Functionality in matching members of family & friends trees with their next of kin allows safe keeping and release of digital and/or physical content to an intended future user. In certain embodiments, the users may have a digital identifier that will be used to link family members and/or friends, e.g., father, mother, son, daughter, best friend, etc.

Figure 3C:
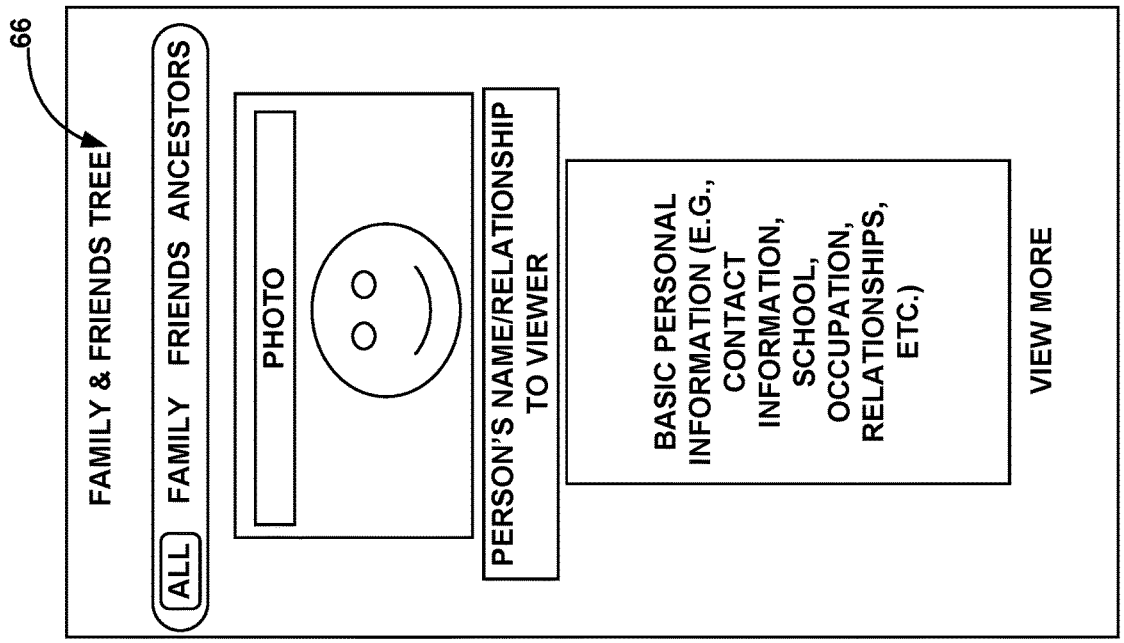
FIG. 3C is an exemplary display screen representing an overview of a subscriber's family-tree profile, as viewed by another subscriber to the private circle, in accordance with the present invention.
Figure 3B:
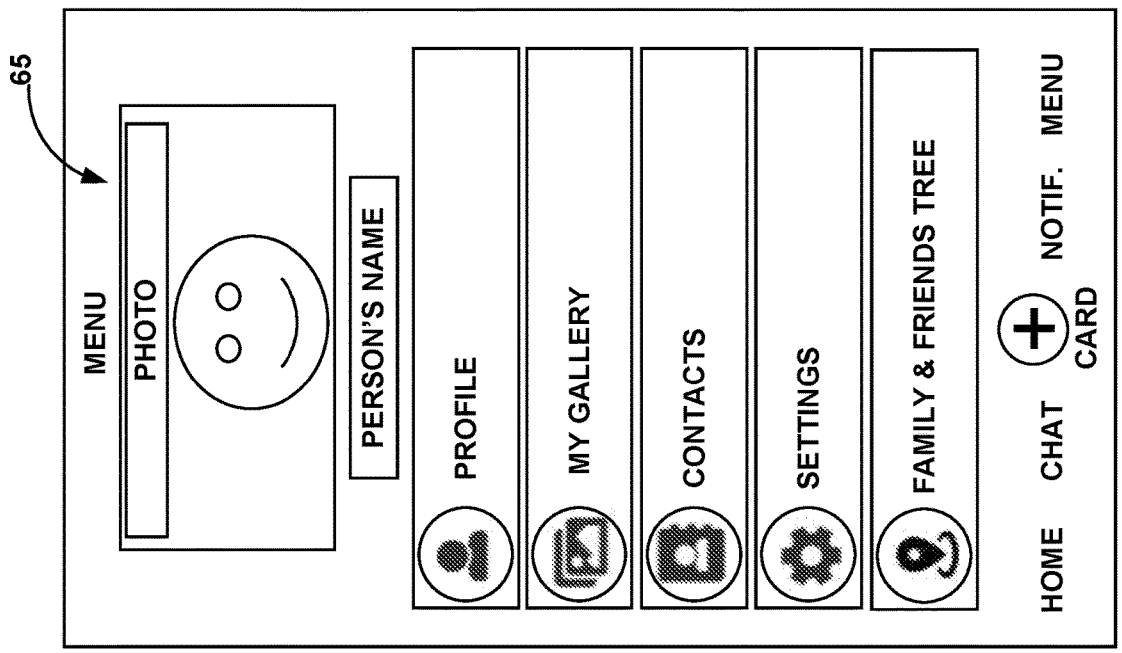
FIG. 3B is an exemplary display screen representing a menu page for a digital profile of a subscriber to the private circle, as viewed by the subscriber, in accordance with the present invention.

FIG. 3B is an exemplary display screen 65 representing a menu page for a digital profile of a subscriber to the private circle, as viewed by the subscriber. The home-screen page 65 may enable the subscriber to navigate to his or her full digital profile, create and view a personal gallery, view a list of contacts with other subscribers to the private circle, view and adjust system settings, and navigate to the private circle's family & friends tree. The home-screen page 65 may also enable the subscriber to begin a chat with other subscribers, view notifications, navigate to a main menu, and/or create a new card for sending content.

FIG. 3C is an exemplary display screen 66 representing an overview of a subscriber's family-tree profile, as viewed by another subscriber, in accordance with the present invention. The overview may a photo of the subscriber and basic personal information pertaining to him or her, such as contact information, the subscriber's school and/or occupation, name of spouse, address, and the like. From display screen 66, the viewing subscriber may navigate to the family-tree profiles of other subscribers to the private circle (e.g., via buttons representing categories of subscribers within the family & friends tree, such as "all," "family," "friends," "ancestors" and the like). The viewing subscriber also may select "view more" to navigate to full family & friends tree profile of the subscriber he or she is viewing.

Figure 3E:
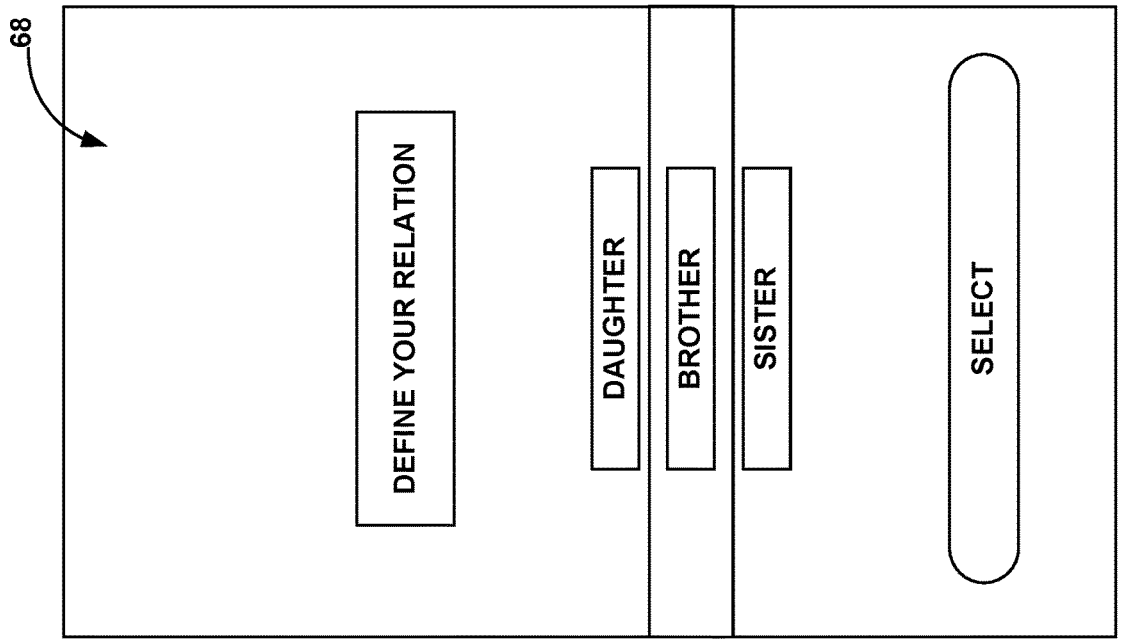
FIG. 3E is an exemplary display screen showing a relationship-mapping page enabling a subscriber to a circle and family & friends tree to define his or her relationship to another subscriber, in accordance with the present invention.
Figure 3D:
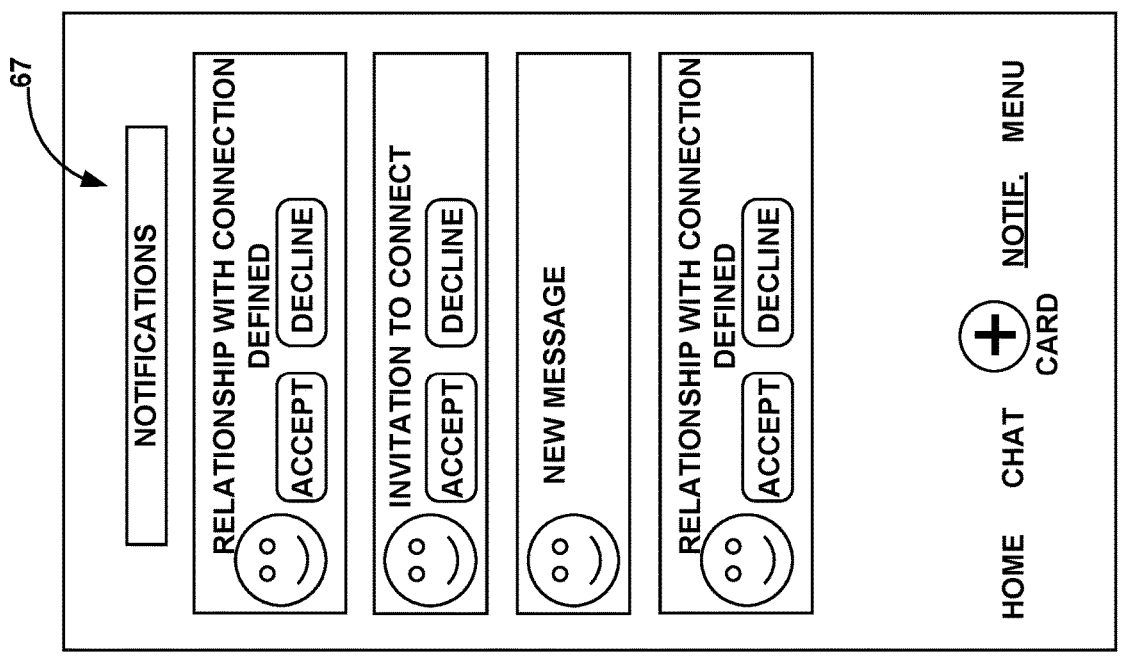
FIG. 3D is an exemplary display screen showing a "notifications" page enabling subscribers to a private circle and family & friends tree to connect with one another, define their relationships, and receive messages from one another, in accordance with the present invention.

FIG. 3D is an exemplary display screen 67 representing a "notifications" page enabling subscribers to a circle and family & friends tree to connect with one another, define their relationships, and receive messages from one another. Via display screen 67, a subscriber may receive messages from other subscribers, invitations to connect with other subscribers, and notifications pertaining to information such as other subscribers' definition of the relationships among one another. Display screen 67 further enables the subscriber to navigate to other features of the private social network, such as a home page, chat function, main menu, and a card builder page. FIG. 3E is an exemplary display screen 68 representing a relationship-mapping page enabling the subscribers to the private circle and family & friends tree to define relationships among one another. Such relationships may be added to the family & friends tree once confirmed by the parties to the relationship. For example, a person may want to designate her brother as such, and may interact with display screen 68 (e.g., after selecting her brother from a contacts list) to select their relationship. The system may send a notification to the brother asking him to confirm or decline the relationship selection (e.g., as shown in display screen 67), and will display the relationship on the family & friends tree if confirmed.

Figure 4A:
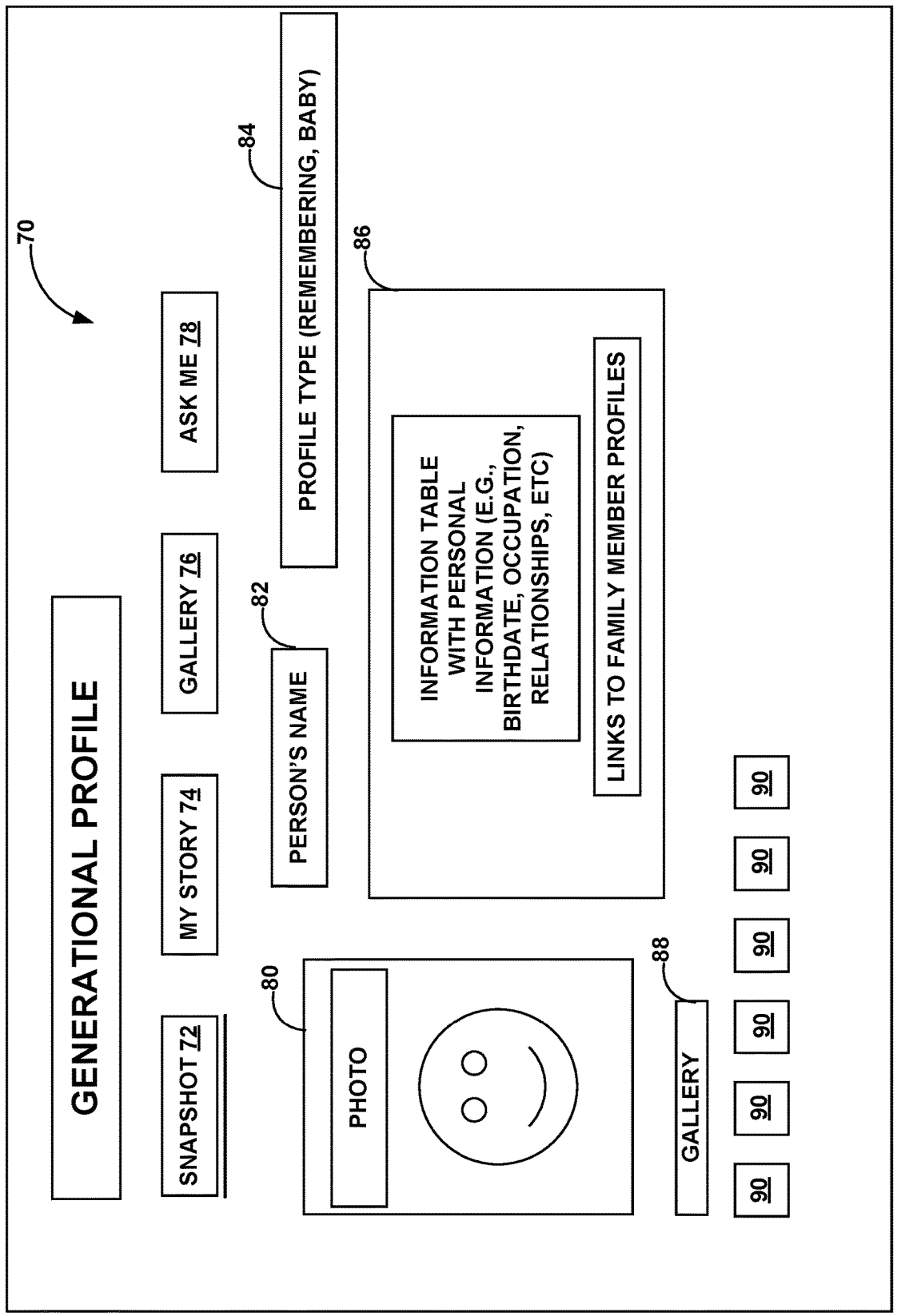
FIG. 4A is an exemplary display screen of a "snapshot" page of an individual's digital profile in the family & friends tree of FIG. 3A.

FIG. 4A is an exemplary display screen of a "snapshot" (or "generational profile") page 70 of a digital family-tree profile of an individual in the family & friends tree of FIG. 3A. The snapshot page 70, as well as the other pages of the digital family-tree profile, may include navigation buttons 72-78 that enable a user to navigate between the pages. The snapshot page 70 further displays the individual's photo 80, name 82, and an information table 86 with a list of personal information pertaining to the individual, such as birthdate, zodiac, birthplace, schools attended, workplace(s), date of death and burial location (if no longer living), immediate family members, charities supported, condolences offered and what people said about the person (if no longer living). The snapshot page 70 may further include an indication of the profile type (e.g., "remembering" or "baby") if the profile is associated with an ancestor or baby. In some examples, the snapshot page 70 may include a gallery section 88 linking gallery content 90 from the gallery page of FIG. 4C to the snapshot page 70.

Figure 4B:
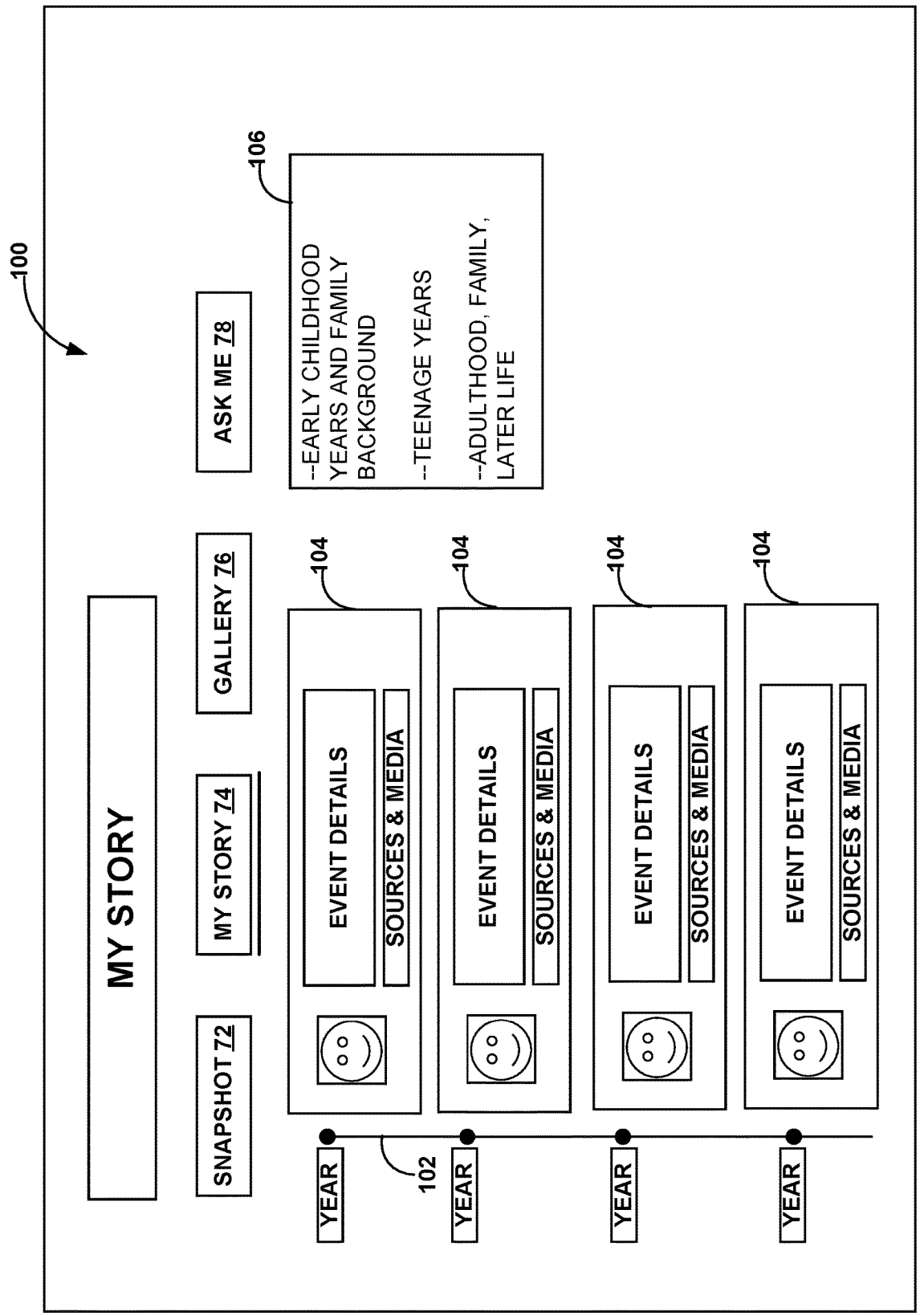
FIG. 4B is an exemplary display screen of a "my story" page of the individual's digital profile in the family & friends tree in the family & friends tree of FIG. 3A.

FIG. 4B is an exemplary display screen of a "my story" page 100 of the digital family-tree profile of an individual in the family & friends tree of FIG. 3A. The "my story" page 100 is a chronological, cradle-to-grave timeline view of an individual's life journey depicting various events 104 in the individual's life, beginning with the individual's birth. For each event 104, a year and the individual's age is indicated on the timeline 102. The timeline is broken down into key areas, such as early childhood and family background, teenage years, adulthood, family, and later life, and the like. Details regarding the event 104 are displayed next to the timeline 102, including, e.g., type of event (such as birth, marriage, military service, occupation, etc.) related photo(s), written details, other media, and/or indications of sources of the information listed. Events 104 may be automatically populated onto the timeline 102. For example, upon detecting that the individual has gotten married, a "marriage" event may appear on the timeline 102, with one or more details such as the date and location of the event. As with other content of a family & friends tree member's digital profile, details regarding the events 104 may be edited by the individual (if living) or by other family & friends tree members if the individual is an ancestor. The "my story" page 100 may also include a map 106 containing links that enable a viewer to navigate to the different key areas of the individual's timeline 102.

Figure 4C:
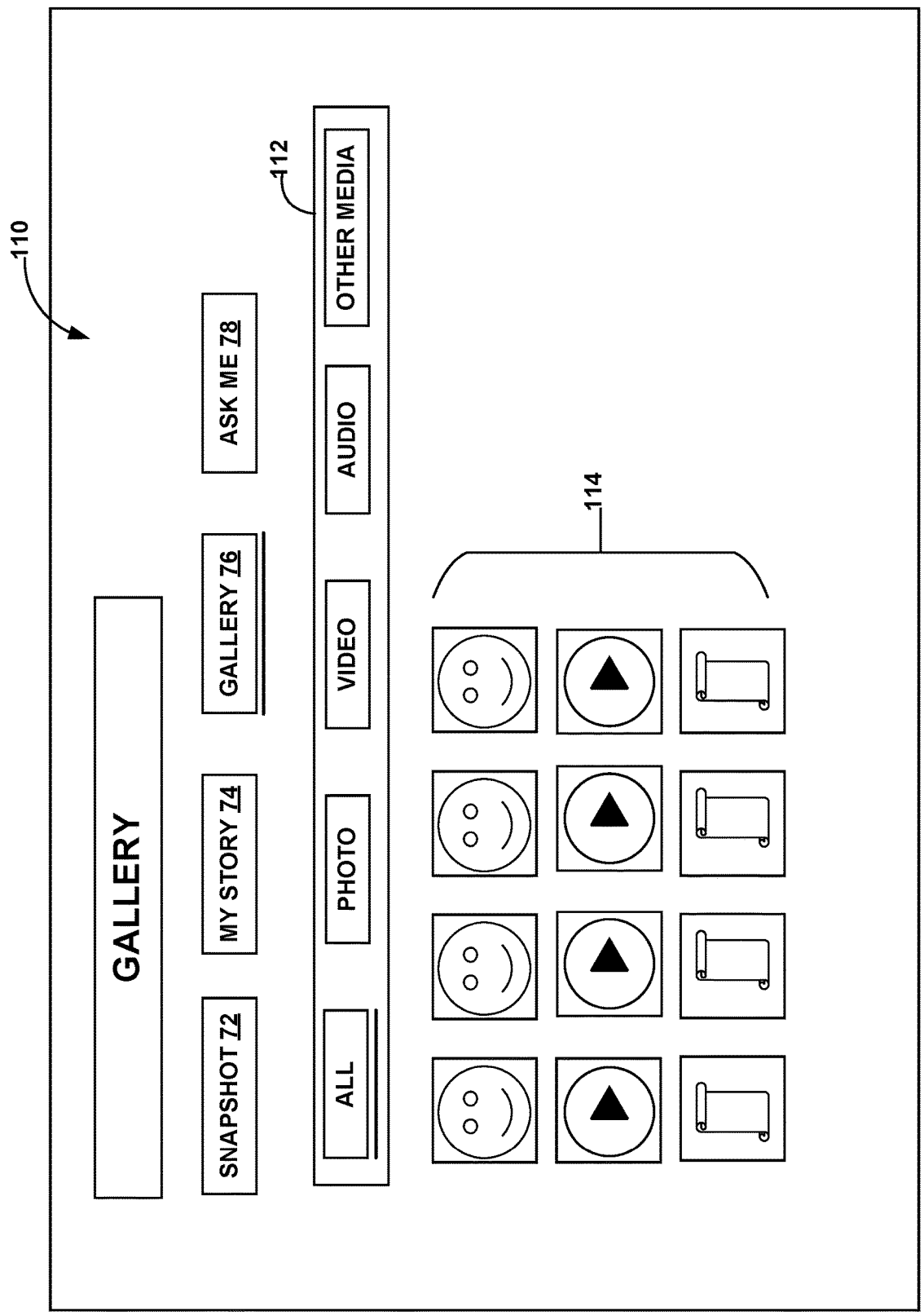
FIG. 4C is an exemplary display screen of a "gallery" page of the individual's digital profile in the family & friends tree in the family & friends tree of FIG. 3A.

FIG. 4C is an exemplary display screen of a "gallery" page 110 of the digital family-tree profile of an individual in the family & friends tree of FIG. 3A. The gallery page 110 includes a content filter 112 that enables the user to select content of a particular format; e.g., photo, video, audio, other media (e.g., written documents), or to view all types. Content icons 114 each represent a digital content item associated with the individual such as a photo, video, audio recording, document, or the like. The digital content items may be uploaded to the individual's digital family-tree profile by the individual (if living) or by other family & friends tree members if the individual is an ancestor.

Figure 4D:
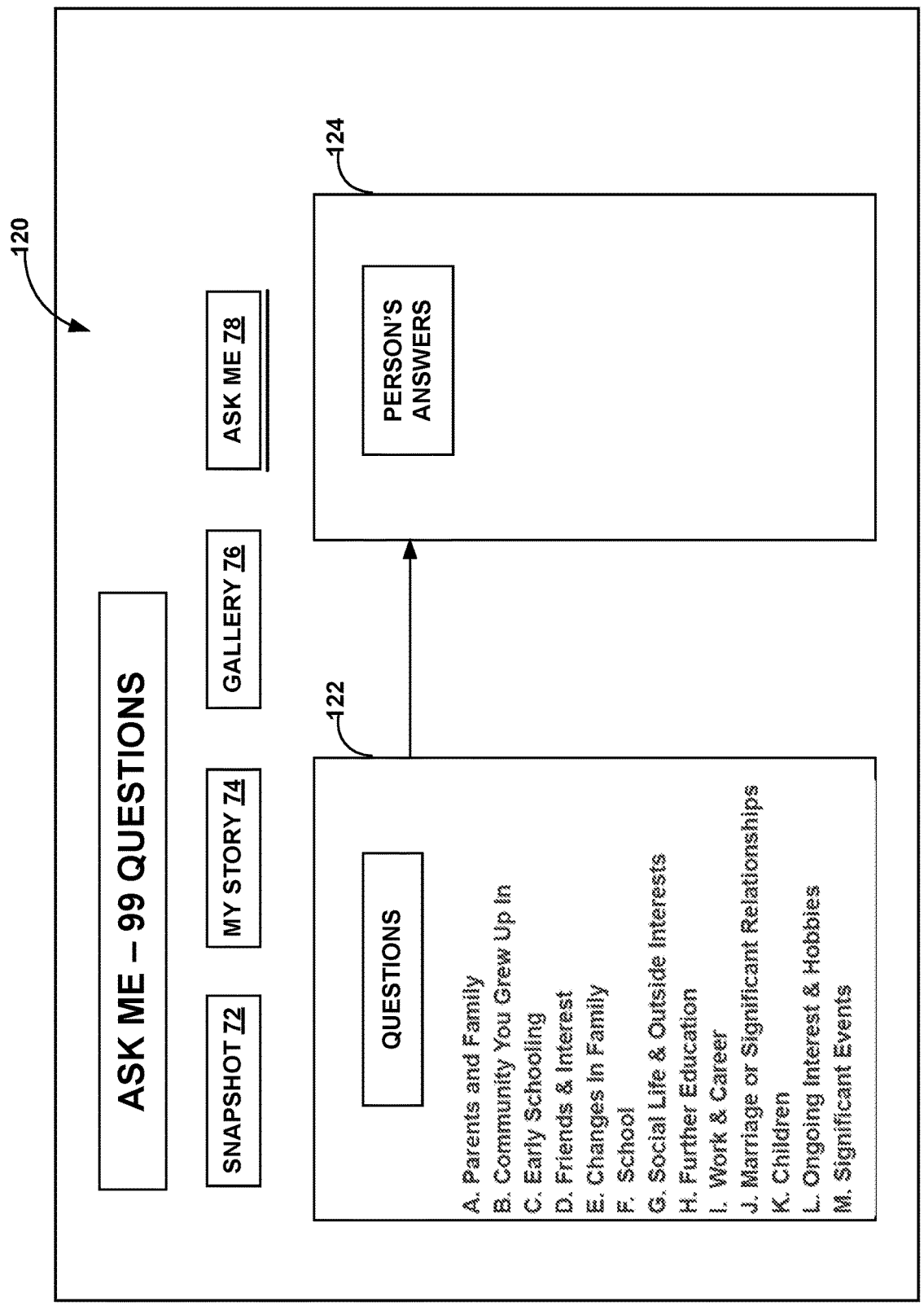
FIG. 4D is an exemplary display screen of a "ask me" page of the individual's digital profile in the family & friends tree in the family & friends tree of FIG. 3A.

FIG. 4D is an exemplary display screen of an "ask me" page 120 of the digital family-tree profile of an individual in the family & friends tree of FIG. 3A. The "ask me" page 120 includes a list of questions 122 and the individual's answers to the questions 124. In some embodiments, the list may include 99 questions covering multiple topics relating to the individual's life experiences, memories, knowledge, preferences, interests, family traditions, and the like, as shown in list 122, although any number of questions may be used. The questions may be designed to capture important and fun things about the individual that future generations may ask about, such as a particular recipe known by the individual or what their childhood was like. The individual can provide the answers to the questions in written form, in pictures, in videos, or in voice recordings. In the ways described above, the interactive family & friends tree provided by the present invention advantageously can keep an individual's life story alive for future family generations. The future generations of the family thus can learn more about their family history, traditions, and values by visiting an individual's digital family & friends tree profile, even if the individual is no longer alive and the information contained in his or her digital family & friends tree profile is lost to living memory.

Figure 5:
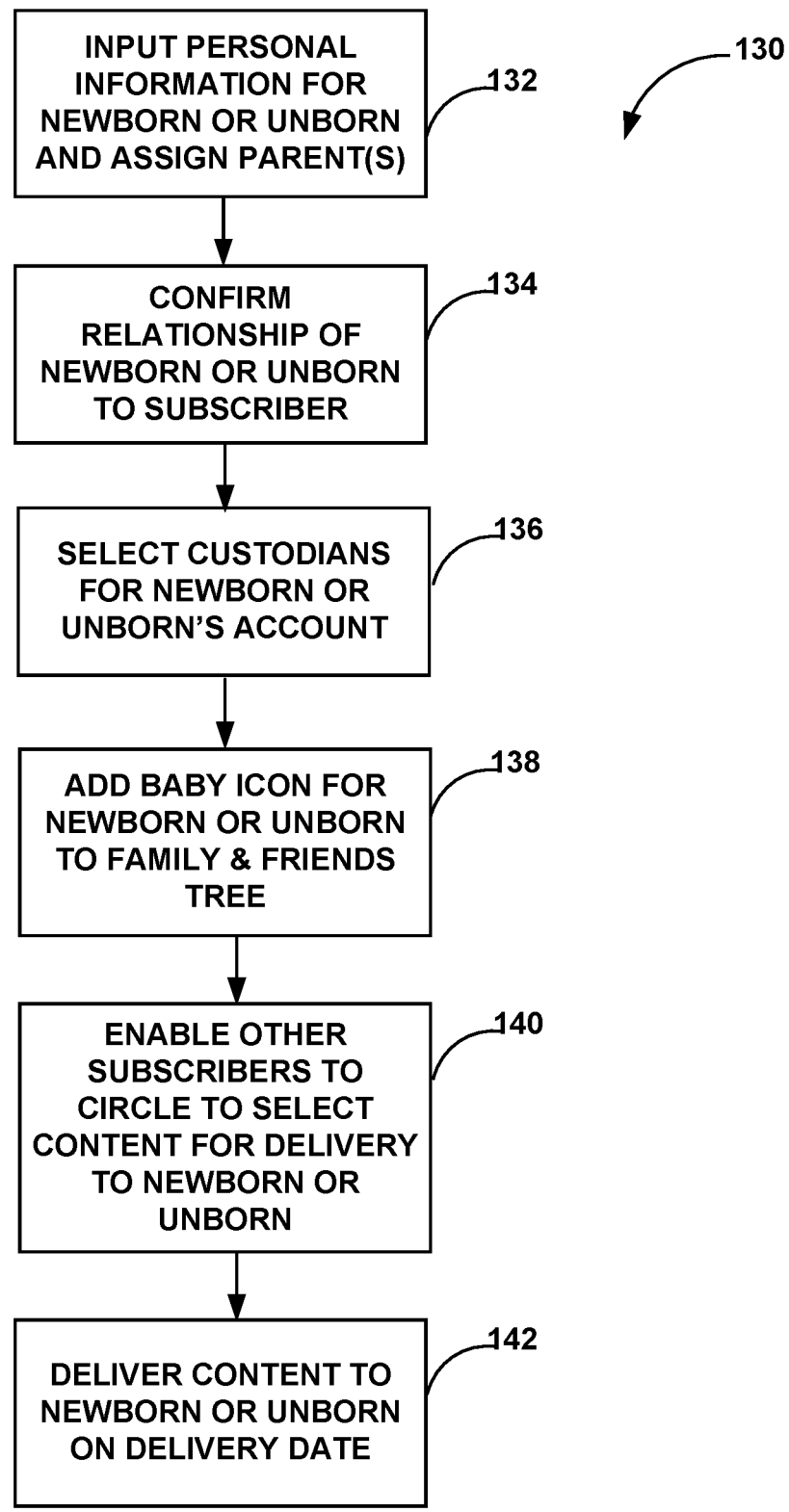
FIG. 5 is a block process flow diagram of one embodiment of the present invention showing an overview of how the system operating on the platform of FIG. 1 enables a subscriber to create a child's account for a newborn or unborn person in the private circle and add the newborn or unborn to the family & friends tree.
Figure 6F:
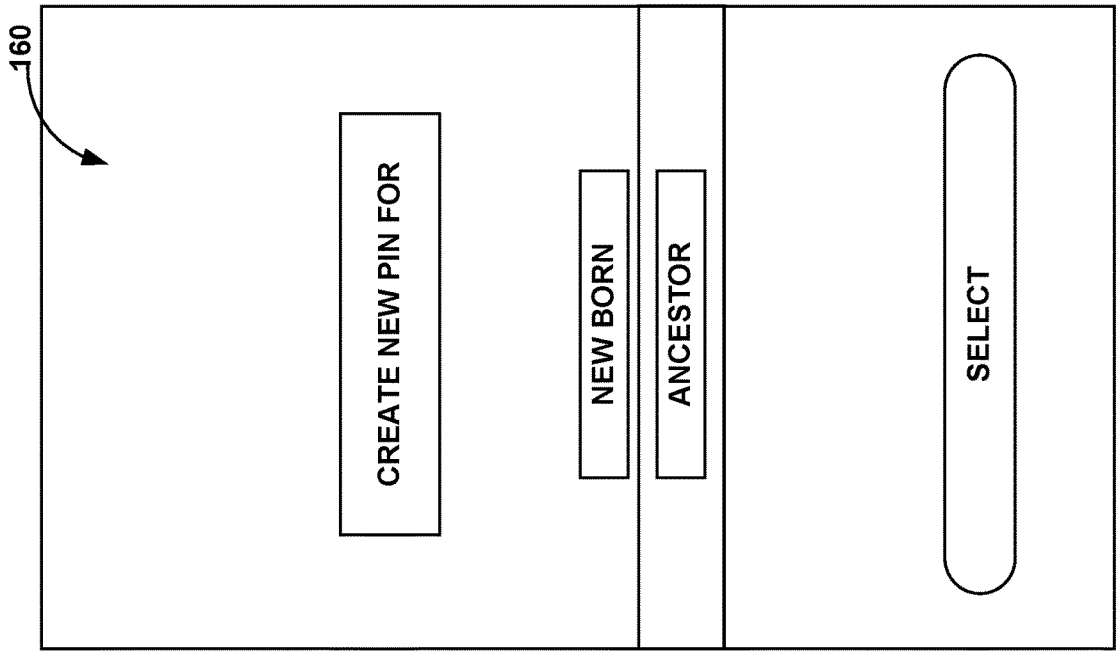
FIG. 6F is an exemplary display screen showing a "new pin" page enabling a subscriber to create a new pin for a child or ancestor on the family & friends tree, in accordance with the present invention.
Figure 6E:
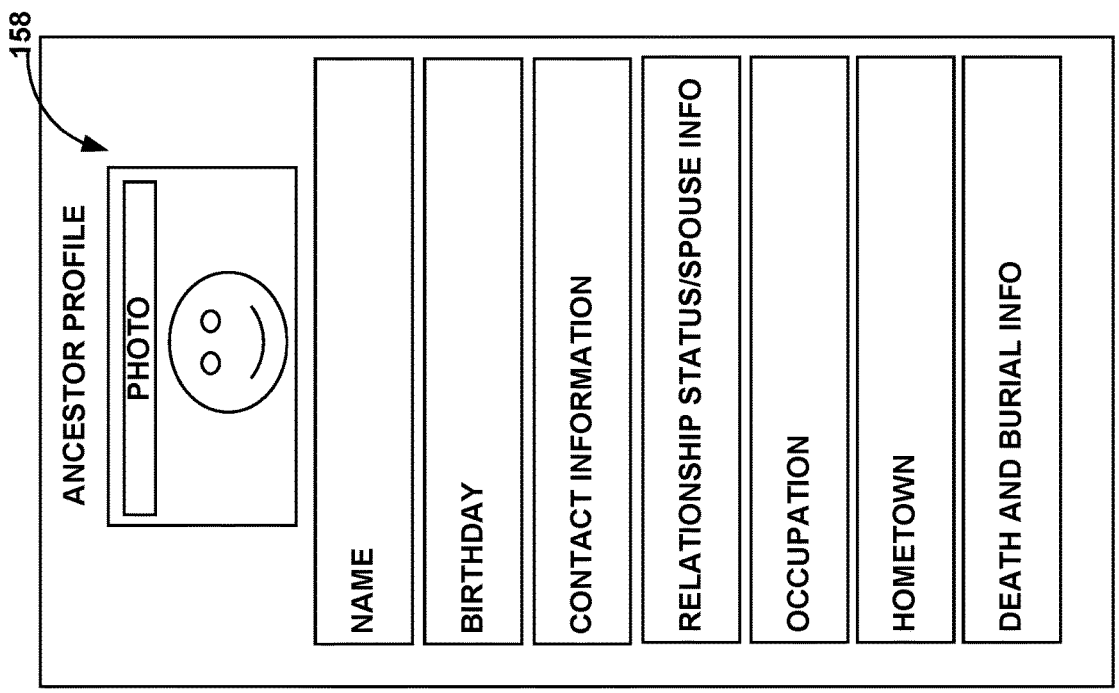
FIG. 6E is an exemplary display screen showing an "ancestor profile" page, in accordance with the present invention.

FIGS. 5-6F illustrate processes and exemplary screen displays enabling subscribers to the private circle to create accounts and/or family & friends tree profiles for an individual that cannot do so for himself or herself, such as a newborn or unborn person or a deceased ancestor. It should be noted that certain aspects of the process of FIG. 5, which is described further with respect to the exemplary screen displays represented in FIGS. 6A-6D and 6F, may be adapted to the creation of a family-tree profile for an ancestor, as specifically represented in and described with respect to FIG. 6E.

FIG. 5 is a block process flow diagram showing an overview of how the system operating on the platform of FIG. 1 enables a subscriber to create a child's account for a newborn or unborn person in the private circle and add the newborn or unborn to the family & friends tree. As discussed herein, the private social network and private circle may be enabled to include both current subscribers and future subscribers who are not yet born, or who are newborn, but are identified by relationship with the subscriber. In such examples, the system may enable a parent (or other custodian) to create an account on the private social network for the unborn or newborn child according to the process 130 of FIG. 5. The account may include an email address and password for the unborn or newborn child, which can be passed on to the child from the parent(s), either manually by the parent(s) or via custodian(s), when the child is old enough to assume control of the account. At 132 of FIG. 5, the parent inputs personal information pertaining to the unborn or newborn child, such as the child's name, birthday (if available; if not, the child's spot in the family birth order; e.g., first born, second, etc.), phone number and/or email address (if available), and assigns one or both parents (who are subscribers to the private circle) as the child's parents. The parent(s) then confirm their relationship to the unborn or newborn child at 134. Next, the parent creating the account for the unborn or newborn assigns multiple custodians (e.g., three) from within the private circle to the account at 136. The individuals assigned as custodians will receive a notification that they have been assigned to the unborn or newborn's account and can accept or deny the assignment. In the event that the parent(s) who created the account are deceased before control of the account passes to the child for whom it was created, the confirmed custodians can assume control of the child's account.

Once the new child's account has been created for the unborn or newborn, the system places a baby icon on the family & friends tree associated with the private circle at 138. The parent(s) then can add content to a digital family & friends tree profile for the unborn or newborn child and enable other subscribers to the private circle to select digital and/or physical content for delivery to the unborn or newborn at 140. At 142, the system then will deliver the content to the unborn or newborn's account, as further described below with respect to FIGS. 7-10G. Once the unborn or newborn child is old enough to assume control of the account, the email address and password associated with the child's account is passed on to the child. Upon logging into the account, the child can accept a connection with the parent(s) and/or custodians, who will be notified of this account activity and either accept the activity, thereby passing control of the account to the child, or flag the activity for further validation of the child's identity. Alternatively, if the child does not have the login information for the child's account, the child may join the private social network upon reaching a minimum age and connect with the parent(s) and/or custodians, who can confirm the child's identity or flag it for further validation. In either example, once the child has reached a minimum age and his or her identity is validated, control of the account passes to the child and the account becomes a regular user account.

FIGS. 6A-6F illustrate exemplary display screens enabling a subscriber to establish a child's account for a newborn or unborn person in the private circle and add the newborn or unborn to the family & friends tree or to add an ancestor profile to the family & friends tree. From the "contacts" screen 150 represented in FIG. 6A, a subscriber can begin the process of establishing a child's account or ancestor profile (or select a contact to send a message to or start a chat with). For example, if the subscriber chooses to create a child's account at screen 150, the system next provides a child account screen 152, represented in FIG. 6B, from which the subscriber can input and view personal information for a child (unborn or born), input and view the subscriber's relationship to the child, and view existing custodians once the child account is established. FIG. 6C is an exemplary display screen showing a relationship-identification page 154 enabling the parent (or other legal custodian creating the account) to indicate his or her relationship to child during creation of the child's account. Once the child's account is created, other subscribers may use relationship identification page 154 to indicate their relationship to the child. FIG. 6D is an exemplary display screen representing a custodian-selection page 156 that enables the parent (or other legal custodian creating the account) to select custodians, from his or her contacts within the private circle, for the child's account during creation of the account.

FIG. 6E is an exemplary display screen 158 showing an "ancestor profile" page enabling a subscriber to the private circle to input and view information for an ancestor's profile page, in accordance with the present invention. As discussed above, other subscribers having access to the family & friends tree can collaboratively help build the ancestor's digital profile within the family & friends tree by adding information to the ancestor's profile. In some examples, the subscriber who created the ancestor's profile may invite other subscribers to the private circle to contribute to the ancestor's profile, or other subscribers to the private circle may request access to contribute to the ancestor's profile. Regardless of whether the new account created by the process of FIGS. 5-6E is a child's account or an ancestor profile, a new pin on the family & friends tree may be created for the child or ancestor, as represented in exemplary display screen 160 represented in FIG. 6F. In the case of a child's account, the subscriber creating the account then may invite other subscribers to the private circle to create, store, and send content to the child's account (e.g., cards, gifts, and the like). Additionally, the other subscribers to the private circle may select the child's pin on the family & friends tree or select the child's name from a contact list to create, store, and send content to be delivered to the child's account.

FIGS. 7-10G illustrate processes and system features that enable a subscriber to a private circle to arrange for the system of the present invention to deliver content to a designated recipient, either on a specified date or as a "smart card" for which the system predicts a delivery date based on data gathered from other users of the private circle, such as by applying machine learning algorithms to the data. It should also be noted that a subscriber alternatively may use the system to send content to a designated recipient in effectively real time; i.e., without delay to a future date or event. For example, the app may provide the subscriber with an address book lookup for identifying designated recipient information in combination with a "send now" icon button to deliver selected content in effectively real time.

Figure 7:
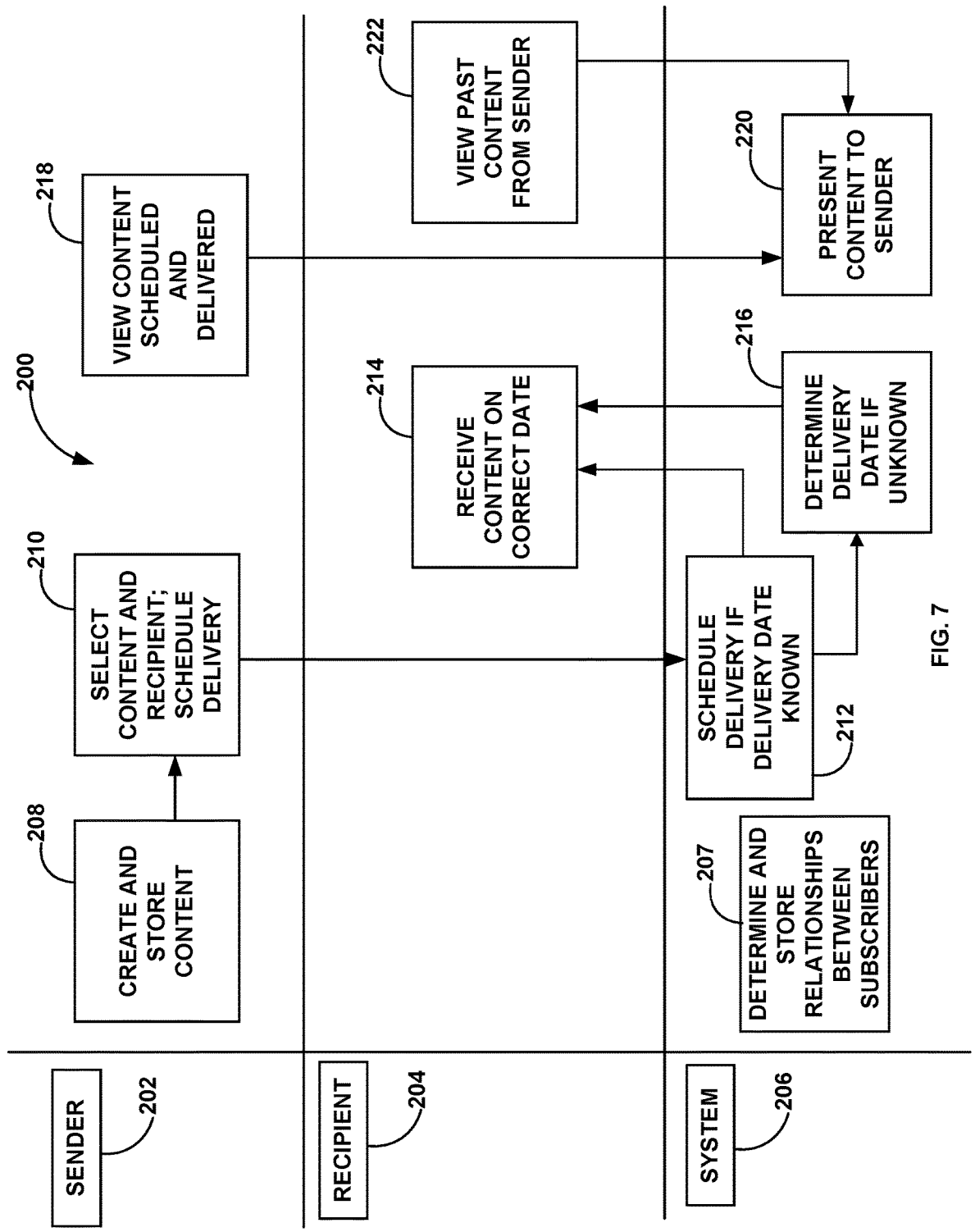
FIG. 7 is a block process flow diagram of one embodiment of the present invention, illustrating an overview of a process by which content selected by a subscriber to a private circle is delivered to a designated recipient.

FIG. 7 is a block process flow diagram of one embodiment of the present invention, illustrating an overview of a process 200 by which content selected by a subscriber to a private circle is delivered to a designated recipient. FIG. 7 divides the process flow into three categories: Sender (a first subscriber to the circle and/or a collaborator subscribed to the circle) 202, Designated Recipient 204 and System 206. The system 206 is adapted to determine and store relationships between subscribers 207.

The sender 202 creates digital content at 208, as discussed above regarding FIG. 2 at 34, which may comprise video, audio, messaging, emailing and the like. The sender then selects digital content for delivery to a designated recipient (e.g., by selecting the recipient from an address book within the app or from the family & friends tree) and schedules delivery of the selected content by selecting the delivery date and/or a future delivery triggering event for the selected content at 210. Additionally, or alternatively, the subscriber may also use the application's interface to identify and select one or more physical content items for future delivery designation. The selected content is categorized by, inter alia, delivery date and/or future delivery triggering event, and scheduled for delivery at 210 to the designated recipient 204.

As with the selected content, the delivery date and/or future delivery triggering event may be modified or edited by the subscriber or by his or her designee or proxy up to the point of the future delivery. The delivery date may be a single date in time that may be in the future, may be a series of dates and/or may be a recurring date. Similarly, the future delivery triggering event may be a single future event, a series of future events and/or a recurrent future event. The selected delivery date and/or future delivery triggering event may be modified or edited by the subscriber or by his or her designee or proxy up to the point of the future delivery. The subscriber also selects a designated recipient of the selected content at 210. As defined herein, "designated recipient" refers to one or more of the following:

(1) A specific subscriber to the private circle who is either living or who has not yet been born, or are newborn, but is identified by relationship with the sender-subscriber, e.g., a child, a grandchild, a great grandchild, and the like. If the designated recipient is not born at the time of designation by the subscriber as described herein, then once the designated recipient is born and meets the criterion, e.g., child, grandchild, etc., then the designated recipient either subscribes and enters the established circle when he or she is of an age that allows taking such action, or an adult or other person assists that person to subscribe and enter or join the established circle. Once this is accomplished, the selected content will be scheduled for delivery to the designated recipient as provided by the subscriber.

(2) One or more specific people within private circle(s) that are associated with the sender-subscriber's private circle, i.e., a network of associated circles.

(3) All people within one or more of the sender-subscriber's private circle and/or a network of associated circles.

(4) Any combination of the above.

The designated recipient may be modified or edited by the subscriber or by his or her designee or proxy up to the point of the future delivery.

Selection of the delivery date and/or a future delivery triggering event for the selected content to the designated recipient at 210 gives rise to a number of options for sharing the content with the designated recipient:

(1) The selected content may be shared right away with the designated recipient.

For example, the following events may be the event triggering content delivery: news of a pregnancy, news of a birth, a graduation, a wedding, a wedding anniversary, a funeral, and the like.

(2) The selected content may be scheduled for delivery or sharing with the designated recipient at a future milestone event that may, or may not, occur.

For example, a future birth and/or birthday(s) of a living child, grandchild, great grandchild, niece, nephew, etc. may be a future milestone event. Further, a future birth and/or birthday(s) of a presently unborn child, grandchild, great grandchild, niece, nephew, etc. may be a future milestone event.

(3) The selected content may be scheduled for delivery or sharing with the designated recipient at a specific future date(s).

For example, the future milestone event(s) may coincide with holidays or other special days or occasions of note such as birthdays, mother's day, father's day, Christmas, valentine's day and the like.

Each of these delivery dates and/or future milestone events may be scheduled for a single content delivery on a single date or future event, or may be a recurring delivery up to a certain point in time or event. For example, a grandfather may store a series of video messages, or other digital and/or physical content, to grandchildren, whether born or unborn, that begin with delivery at age 2 and continue at each birthday up to age 21.

From the perspective of the system 206, if the delivery date is known, the system 206 schedules delivery of the created content 212 and the selected content is delivered to the designated recipient 204 at 214.

If the delivery date is unknown, i.e., the selected content is scheduled for delivery as a "smart card" upon the occurrence of a future delivery triggering event, then the system applies artificial intelligence or machine-learning algorithms to identify the occurrence of the event and/or predict the occurrence of the event 216. For example, the system may apply the machine-learning algorithms to "listen" to the activity within the private circle of the other subscribers to the circle for information pertaining to the event, analyze the data obtained in this manner, and predict the date of occurrence of the event based on the analysis. Alternatively, the system may collect the future date of occurrence of the event directly from another subscriber to the private circle or may identify the future date of occurrence when another subscriber to the circle schedules a delivery of content for the same future delivery triggering event and provides a corresponding future date. When the subject event is determined to have occurred, then the selected content is delivered 214 to the designated recipient 204. In this way, the right content (i.e., the selected content) is shared with the right person (i.e., the designated recipient) at the right time (i.e., the scheduled or determined delivery time and/or occurrence of a future delivery triggering event).

The sender 202 may also view scheduled content messages as they are scheduled and/or delivered 218 and, as discussed above, may edit the delivery date, selected content and/or designated recipient up to the point of scheduled delivery 214. Further, the system 206 may display the scheduled and/or delivered selected content to the subscriber in chronological or other ordering 220.

Finally, the designated recipient 204 may access system 206 to view one or all previously delivered content that were sent by the subscriber/sender 202 to the designated recipient 204.

FIG. 7 illustrates a content-delivery process 200' from a system-based process flow perspective, illustrating in further detail the by which the system determines a delivery date for content to be delivered to designated recipient, regardless of whether the subscriber specified a delivery date. The process 200' begins with the subscriber user creating a content-based message for the designated recipient at 224, the subscriber user then categorizes the message using, e.g., tags at 226 and schedules the content-based message for delivery to the designated recipient by specifying at date, a milestone and/or an event triggering delivery at 228.

If the subscriber user selected a specific delivery date 230, then the system schedules the content-based message for delivery to the designated user 232.

If the subscriber user did not select a specific delivery date at 230 (i.e., designating "smart card" delivery), then if the delivery is based on a milestone 234, and if the milestone start date is known 236, then the delivery date for the selected content-based message is calculated based on the milestone start date 238 and the system schedules the delivery of the content-based message to the designated recipient accordingly at 232. If the milestone start date is not known 236, then the system determines the milestone start date is based on a future event 237, and functionality is executed to determine the event date. Again, the system may apply the artificial intelligence or machine-learning algorithms to "listen" to the activity within the private circle of the other subscribers to the circle (e.g., chats between subscribers) for information pertaining to the event, analyze the data obtained in this manner, and predict the date of occurrence of the milestone event based on this analysis. Alternatively, the system may collect the future date of occurrence of the event directly from another subscriber to the private circle or may identify the future date of occurrence when another subscriber to the circle schedules a delivery of content for the same future delivery triggering event and provides a corresponding future date. In some embodiments and as discussed below with respect to FIGS. 9, 10E and 10F, if the user designates "smart card" delivery for the content to be delivered, the user also selects custodians for the content. The selected custodians may be the other subscribers from whom the system seeks information when trying to confirm the future date of occurrence or if other information regarding the recipient is needed for delivery, such as a physical address for the recipient.

If, on the other hand, the subscriber user did not select a specific delivery date at 230 (i.e., designating "smart card" delivery), and if the delivery is not based on a milestone 234, then the system determines that the delivery date is based on a future event 240, and functionality is executed to determine the event date at 242. Again, the system may apply the artificial intelligence or machine-learning algorithms to "listen" to the activity within the private circle of the other subscribers to the circle for information pertaining to the event, analyze the data obtained in this manner, and predict the date of occurrence of the non-milestone event based on the analysis. Alternatively, the system may collect the future date of occurrence of the event directly from another subscriber to the private circle or may identify the future date of occurrence when another subscriber to the circle schedules a delivery of content for the same future delivery triggering event and provides a corresponding future date. Here, too, the system may seek information from the subscriber's selected custodians when trying to confirm the future date of occurrence or if other information regarding the recipient is needed for delivery, such as a physical address for the recipient.

In the case where the system at 242 is determining a future event date, the system continues to apply the machine-learning algorithms to "listen" to the activity within the private circle of the other subscribers to the circle for information pertaining to the event and analyze the data obtained in this manner to refine the predicted event date and to provide as precise a prediction as possible up until the actual occurrence of the event. The system then schedules the content-based message for delivery to the designated recipient at 232, but may update or change that predicted event date based on updated information obtained in ongoing step 244. If the future event is a milestone and the selected content-based message is to be delivered at the start of the milestone, then the delivery date is scheduled based on the start date of the milestone at 248.

Figure 9:
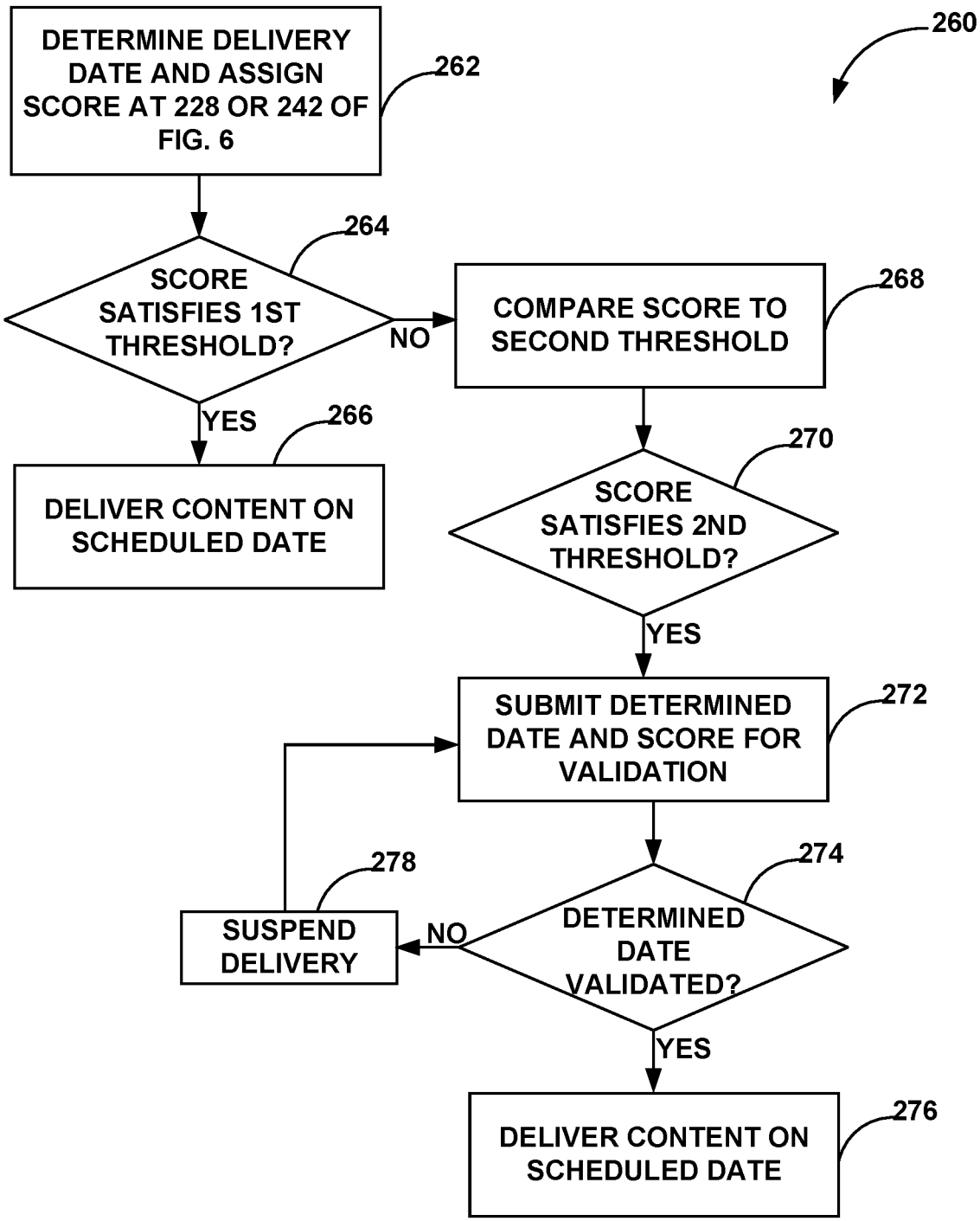
FIG. 9 is a block process flow diagram of one embodiment of the present invention, illustrating a process by which a system operating on the platform of FIG. 1 validates a determined delivery date for content to be delivered to designated recipient.

FIG. 9 is a block process flow diagram of one embodiment of the present invention, illustrating a process 260 by which the system operating on the platform of FIG. 1 validates a delivery date determined by the system. The validation process of FIG. 7 helps ensure the accuracy of the future delivery date determined by the system by assigning a confidence score to the determined date and initiating manual checking of the determined date if the confidence score does not satisfy a first threshold. Manual checking of the determined date may include requests for confirmation of the determined date from other members of the private circle, such as one or more of the custodians selected by the sender. Confidence scores that do not even satisfy a second, lower threshold may result in temporary non-delivery of the content as the determined date cannot be validated at that time; however, the system will continue to attempt to validate the determined date until a confidence score sufficient for delivery can be achieved.

Figure 8:
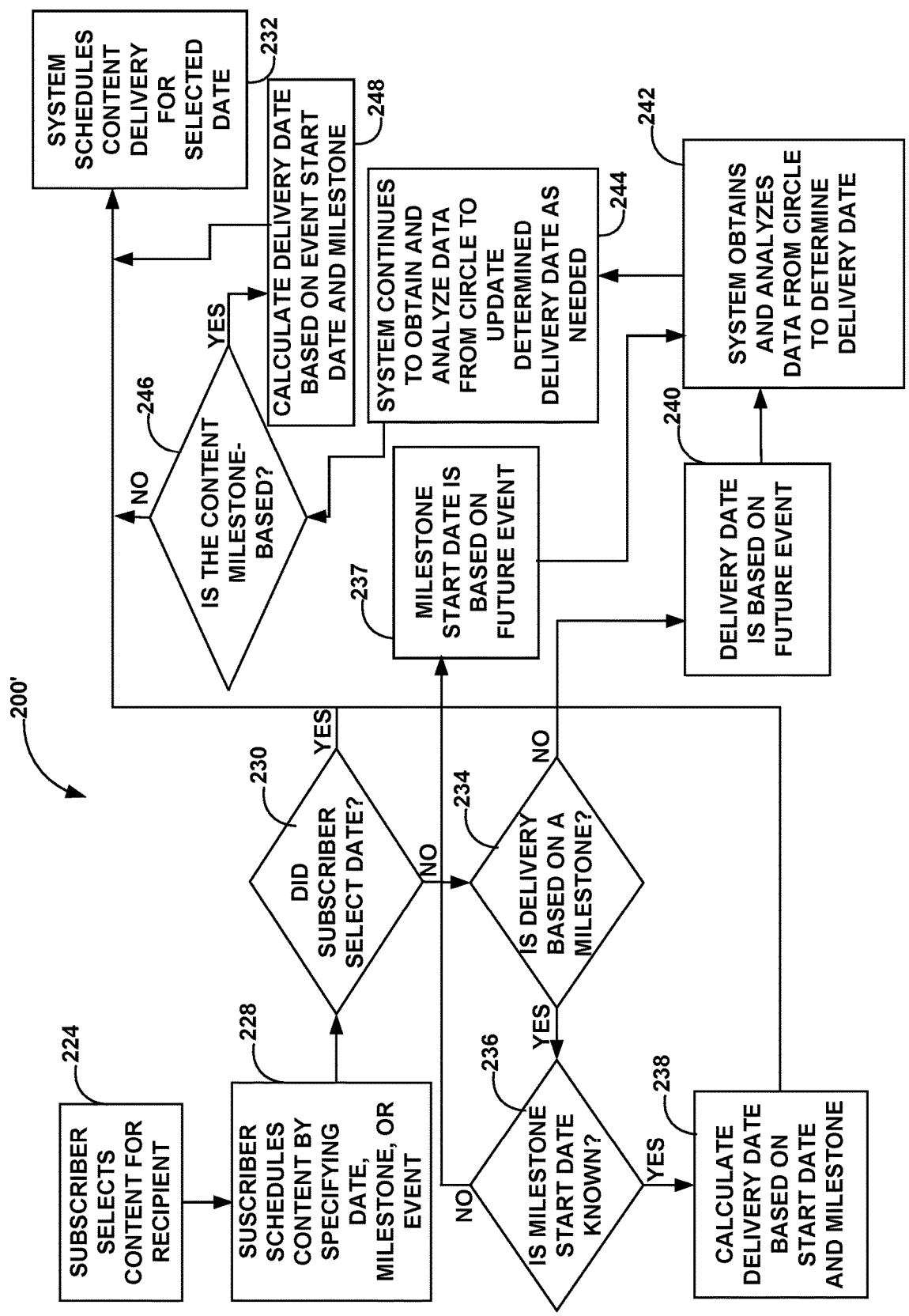
FIG. 8 is a block process flow diagram of one embodiment of the present invention, illustrating in further detail a process by which the system operating on the platform of FIG. 1 determines a delivery date for content to be delivered to designated recipient, regardless of whether the subscriber specified a delivery date.

The system begins process 260 at 262 with the future delivery triggering event date determined at 228 or 242 of process 200' of FIG. 8 at 262. That is, in process 260, the sender may have provided a delivery date or milestone date at 228, but if not, the delivery date has been determined by the system based on data obtained by the system from the private circle and pertaining to the future delivery triggering event. A confidence score is assigned to the determined future delivery triggering event date at 262. In some embodiments, the confidence score may be an integer ranging from 2-10. Each source of data used by the system to determine the date may correspond to an integer value, and the system may arrive at the confidence score by adding the values of each data source used by the system to arrive at the determined date. For example, the data-source values may be as follows:

TABLE 1

| Data source | Value |
| --- | --- |
| Sender provides date | 10 |
| Recipient provides date | 3 |
| Another subscriber to private circle schedules content delivery for the event on particular date | 2 |
| Date is community sourced | 4 |
| Date determined via machine learning | 2 |

The system then compares the confidence score to the first threshold at 264. The first threshold may be a score of 9+(i.e., 9 or 10). Thus, if the sender has provided the date, the date is assigned a confidence score of 10 and automatically approved and the system will make the delivery on the provided date at 266. Alternatively, the determined date may have been based on a sufficient number of data sources to provide a confidence score of 9 or 10 (e.g., recipient provided+community sourced+machine learning), the delivery date is automatically approved and the system will make the delivery on the determined date at 266.

If, however, the confidence score does not satisfy the first threshold of a value of 9+, the confidence score is compared to a second threshold at 268. The second threshold may be a value of 5, such that scores of 5-8 satisfy the second threshold but not the first. If the system determines that the confidence score satisfies the second threshold at 270, the system then flags the determined date for validation at 272. The system then attempts to validate the determined date at 274, such as by requesting confirmation of the determined date from other members of the private circle (e.g., the custodians for the content selected by the sender, relatives of the designated recipient, etc.), applying machine learning techniques to "listen" to activity in the private circle, etc. If the system validates the determined date at 274, the system then delivers the content on the determined date at 276. If, however, the determined date cannot be manually validated, the system temporarily suspends delivery of the content at 278 and continues to attempt to validate the determined date. When the date is ultimately validated, the system then delivers the content on the determined date at 276.

Figure 10B:
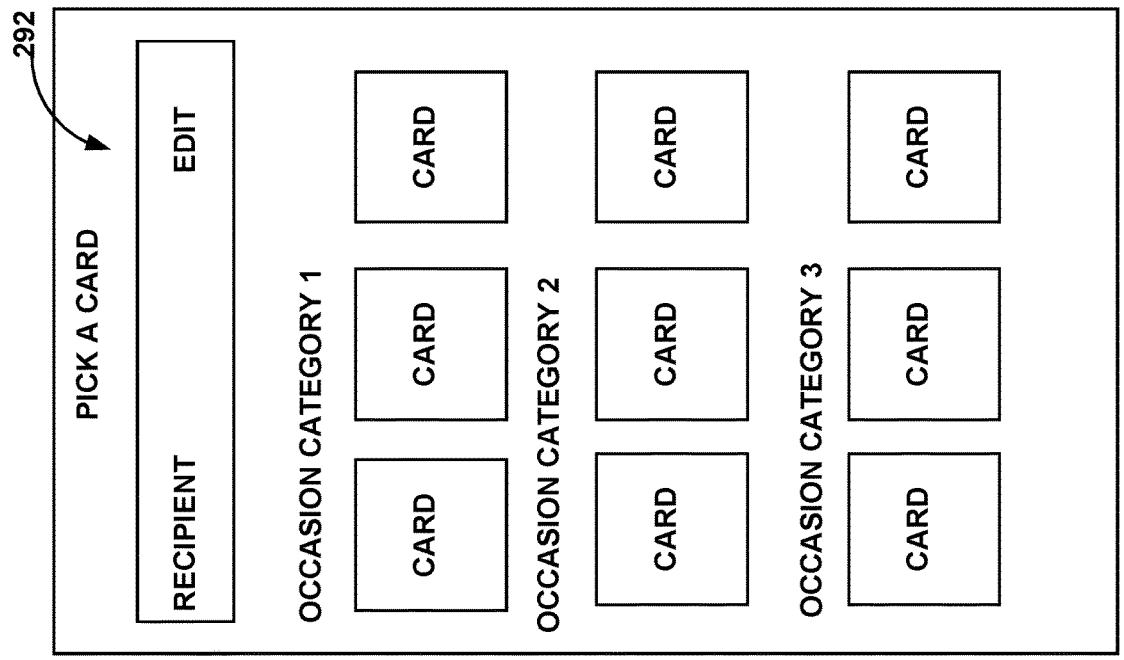
FIG. 10B is an exemplary display screen showing a card-selector page enabling the sender to designate a recipient and select a card for the content to be sent with, in accordance with the present invention.
Figure 10A:
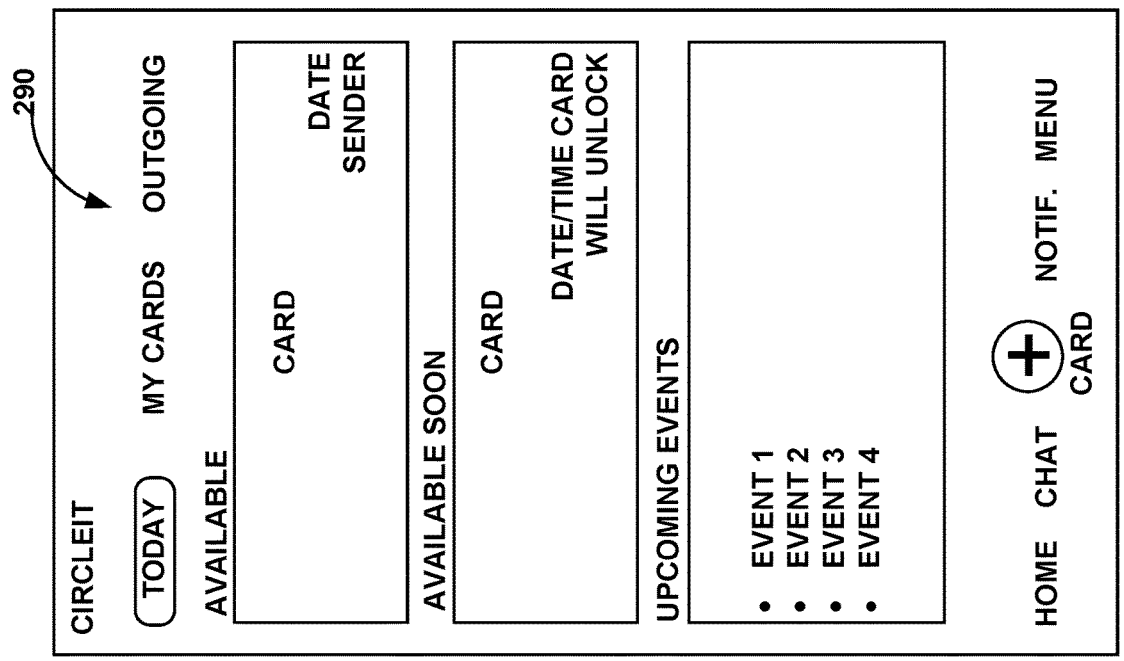
FIG. 10A is an exemplary display screen showing a dashboard page enabling a subscriber-sender to view received content, outgoing content, upcoming events, and to create and schedule a new delivery of content to a designated recipient, in accordance with the present invention.

FIGS. 10A-10G illustrate exemplary display screens enabling a subscriber to create and store content for delivery to a designated recipient, either on a selected date, or as a "smart card" upon occurrence of milestone event or non-milestone event, in accordance with the processes described above with respect to FIGS. 7-9. FIG. 10A is an exemplary display screen 290 showing a dashboard page enabling a subscriber to view received content (e.g., "cards" that are available or will soon be available for the subscriber to view), outgoing content (e.g., content scheduled by the subscriber to designated recipient(s)), upcoming events pertaining to the subscriber's contacts (e.g., a contact's birthday), and to create and schedule a new delivery of content to a designated recipient.

In one example, the subscriber-sender begins the process of scheduling a new delivery of content to a designated recipient by selecting the "plus" symbol represented in FIG. 10A. The system next provides a card-selector screen 292, represented in FIG. 10B, from which the sender can designate a recipient and select a card for the content to be sent with. For example, the subscriber may select from among multiple card styles displayed under one of several occasion categories, such as a holiday category, birthday category, or the like. A card style may feature a cover image and/or text corresponding to the occasion. Next, the sender adds a personal message (e.g., of text, audio, video, and/or photo) for the recipient to the card, via the card builder screen 294 represented in FIG. 10C, and may attach additional media to the card if desired. Additionally, or alternatively the sender may specify physical content to be sent with the card, such as flowers, candy, or physical content held for the sender by the provider of the private social network.

Figure 10D:
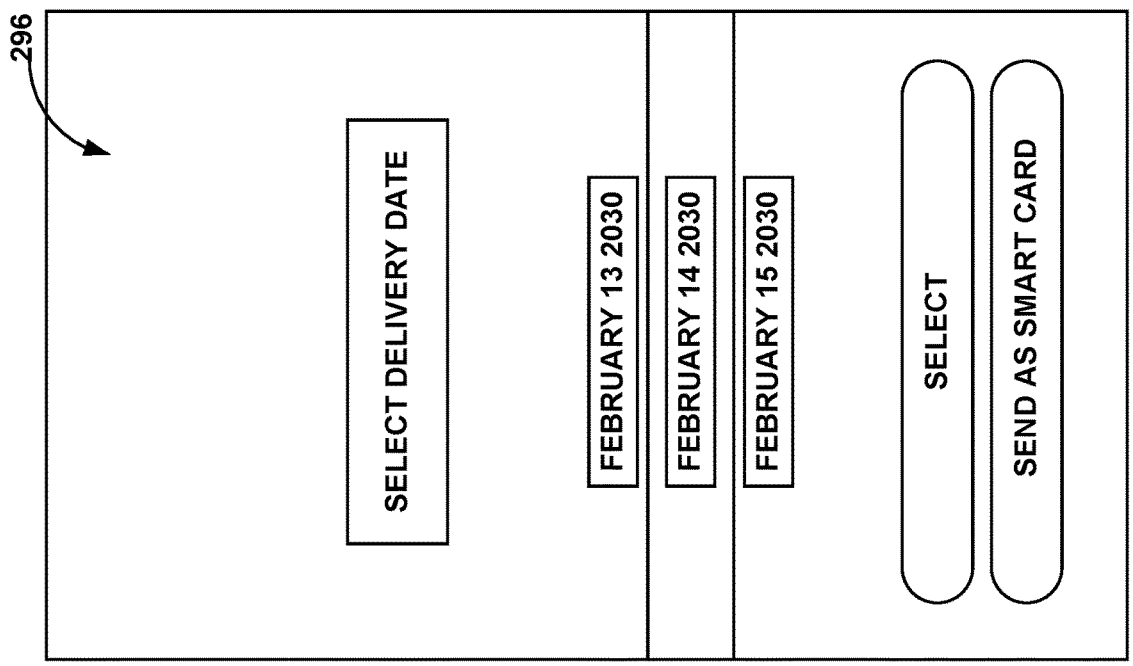
FIG. 10D is an exemplary display screen showing a delivery-selection page enabling the sender to select a delivery date for the card and associated content or to select smart-card delivery for the card and associated content, in accordance with the present invention.
Figure 10C:
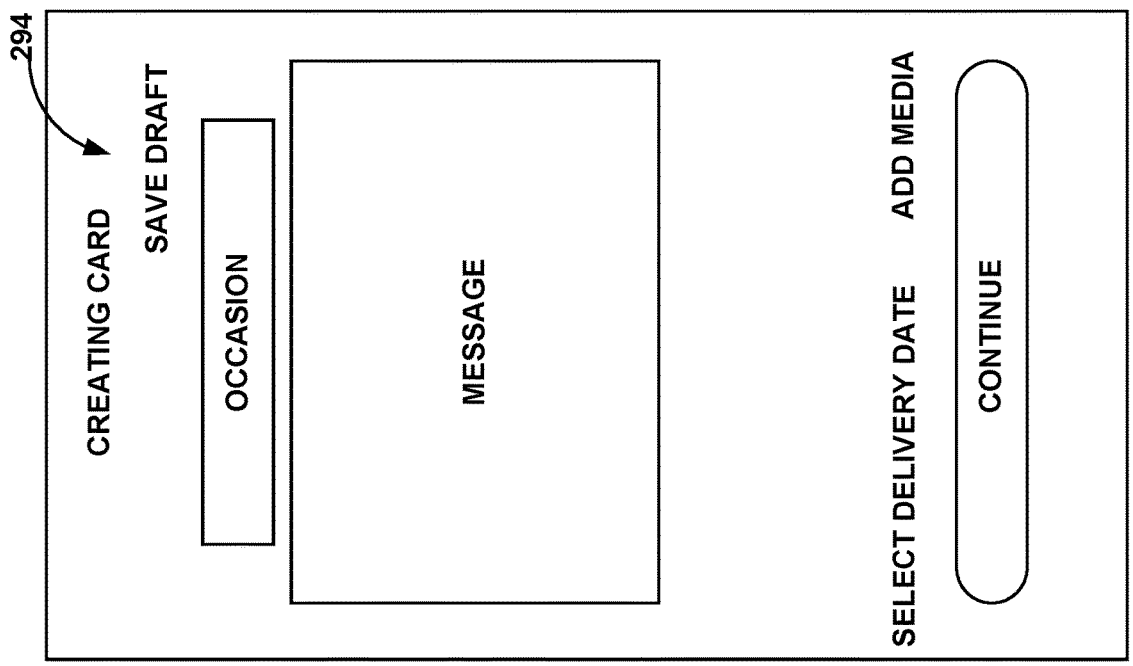
FIG. 10C is an exemplary display screen showing a card-builder page enabling the sender to add a message and select digital or physical content to be sent with the card, in accordance with the present invention.
Figure 10F:
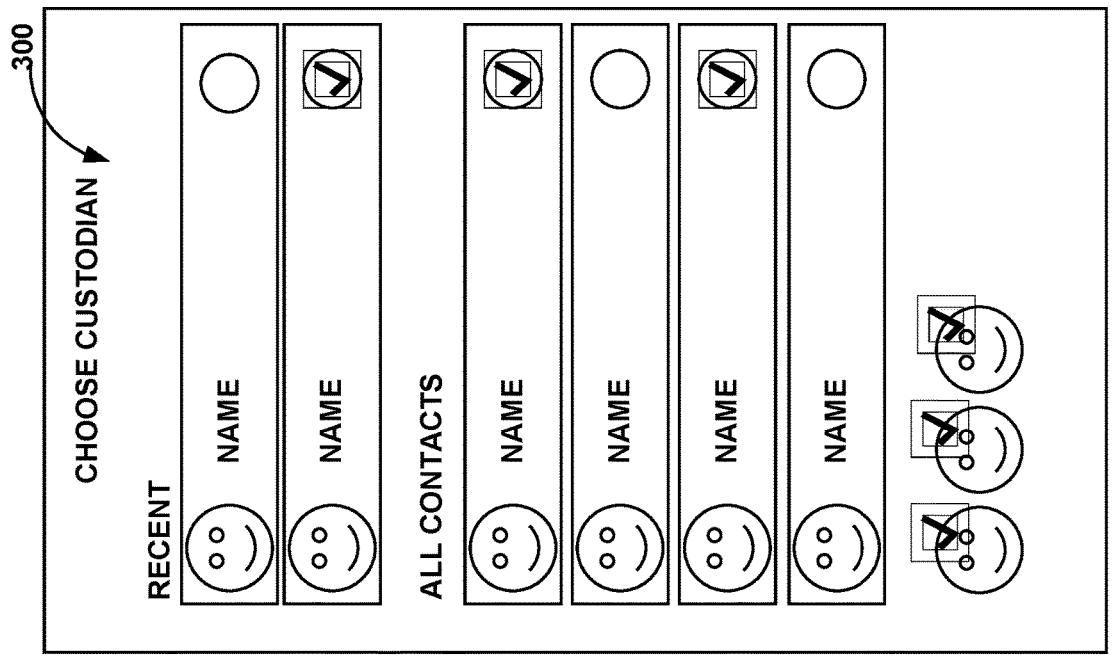
FIG. 10F is an exemplary display screen showing a "custodian selection" page enabling the sender to select custodians for the card and content from among the sender's contacts in the private circle, in accordance with the present invention.
Figure 10E:
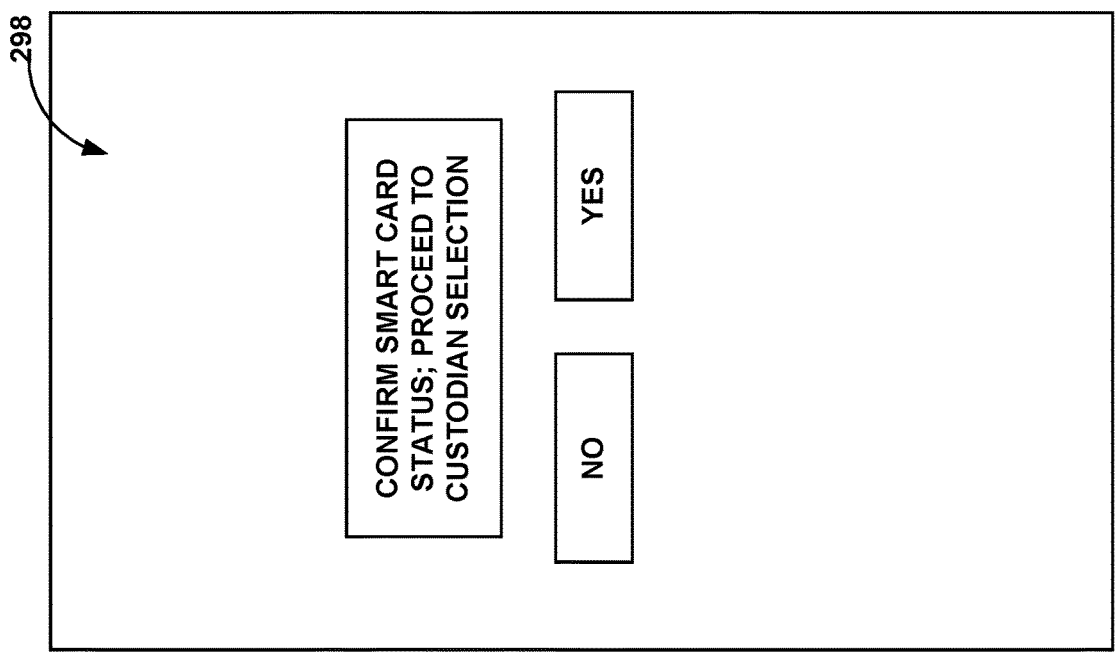
FIG. 10E is an exemplary display screen showing a "custodian alert" page alerting the sender that three custodians must be selected in order for the card to be sent as a smart card, in accordance with the present invention.
Figure 10G:
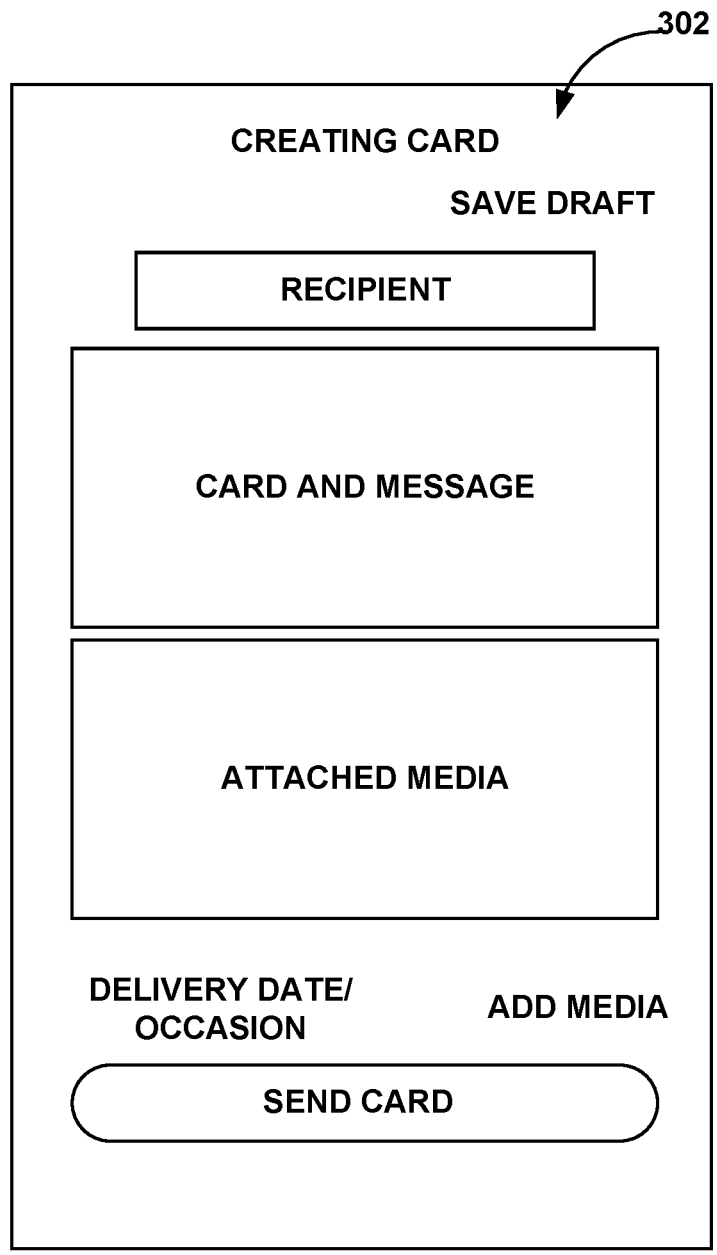
FIG. 10G is an exemplary display screen showing a summary page enabling the sender to review, edit, save, and schedule delivery of the card and associated content, in accordance with the present invention.

The sender then selects a delivery date or indicates that the card is to be sent as a smart card via a delivery-selection screen 296, represented in FIG. 10D. If the sender selects a particular delivery date via screen 296, the system displays a summary of the created card via a card summary screen 302, represented in FIG. 10G, and gives the sender the option to save the draft of the card to complete later, edit the draft of the card, or select a "send now" button to schedule delivery of the card and any associated digital or physical content.

If, however, the sender indicates that the card is to be sent as a smart card at delivery-selection screen 296, the system alerts the sender that three custodians must be selected in order for the card to be sent as a smart card at an alert screen 298 (FIG. 10E), giving the sender the option to continue to select custodians or cancel the smart card status (e.g., via "YES/NO" prompt on alert screen 298). It should be noted that in other embodiments, greater or fewer than three (including zero) custodians may be required to schedule smart card delivery. If the sender elects to continue with smart card status for the delivery, the system displays a custodian-selection screen 300, represented in FIG. 10F and prompts the sender to designate three custodians for the smart card delivery from the sender's contacts within the private circle. After the sender has designated the custodians for the smart card delivery, the system displays the card summary screen 302, represented in FIG. 10G, and gives the sender the option to save the draft of the card to complete later, edit the draft of the card, or select a "send now" button to schedule delivery of the card and any associated digital or physical content.

Figure 11:
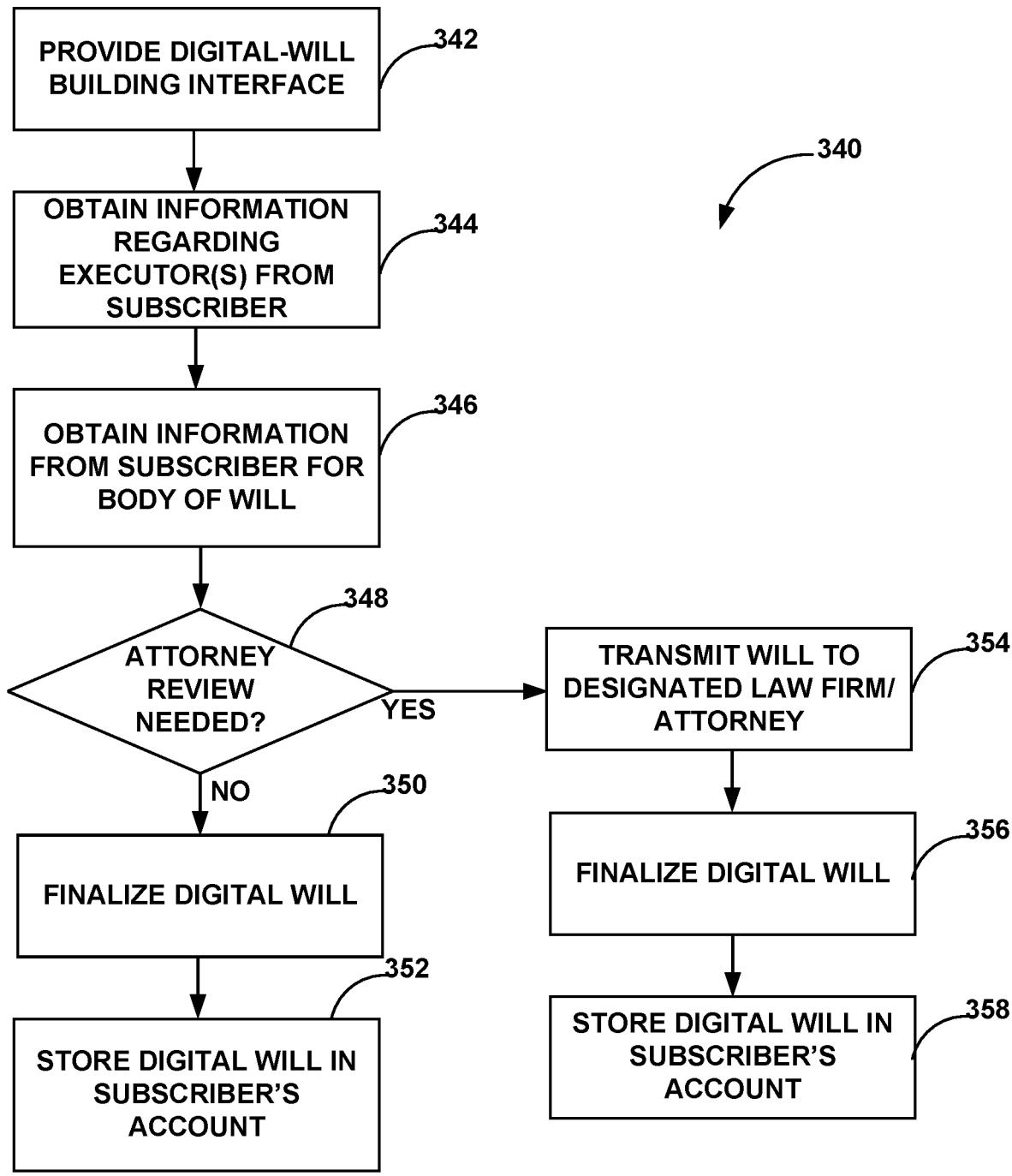
FIG. 11 is a block process flow diagram of one embodiment of the present invention by which the system operating on the platform of FIG. 1 enables a subscriber to the private social network to prepare a digital will.

The private social network described herein may also provide one or more end-of-life features enabling actions to be taken on a subscriber's behalf in the event the subscriber is no longer alive. For example, the system may enable a subscriber to designate one or more custodians (e.g., three custodians) to take actions on the subscriber's account on the subscriber's behalf when he or she is no longer alive. Such actions may include creating and/or scheduling delivery of content to other subscribers to the private network, adding or removing content from his or her digital profile and/or family & friends tree profile, or the like. Additionally, or alternatively, the private social network described herein may provide options for a subscriber to prepare his or her will. FIG. 11 is a block process flow diagram of one embodiment of the present invention, by which the system operating on the platform of FIG. 1 provides a process 340 for a subscriber to the private social network to prepare a digital will for himself or herself, in most cases without the need for engaging the assistance of legal counsel. If, however, one or more portions of the subscriber's digital will raise complex legal issues with which an attorney's assistance would be desirable, the system is configured to transmit the digital will to a designated law firm or attorney for review and assistance. In this manner, the subscriber can obtain the cost-saving advantages of preparing his or her own will while having the peace of mind offered by legal counsel if necessary. The subscriber's completed digital will can also be stored in connection with the subscriber's private circle, enabling the system to deliver content willed by the subscriber to other subscribers to the private circle upon execution of the digital will.

At 342, the system provides an interface enabling the subscriber to begin drafting his or her digital will. The interface may be embodied in the same application as the subscriber's private circle and family & friends tree, or alternatively may be embodied in a companion application. In either case, the digital will may be stored in connection with the subscriber's private circle as noted above. Next, the system obtains data pertaining to the subscriber's chosen executor(s) who will be designated to take action on the subscriber's behalf, such as their identities, relationship to the subscriber, contact information, and the like at 344. Next, the system obtains information from the subscriber to fill out the body of the digital will at 346. As an example, the digital will may include sections for any or all of the following information, although other sections not listed here may be additionally or alternatively present:

Heading, Marital History, and Children
Assets, Debt & Taxes
Real Property
Disposition of Assets
Guardianship
Executor and Trustee
Executor and Trustee Powers
No Contest Provision
General Provision
Definitions
Trusts
Funeral Arrangements
Gifts & Undelivered Items
Signatures Next, the system analyzes the information provided by the subscriber to the body of the will to determine whether attorney review is needed at 348. If not, the system guides the subscriber to finalize the will at 350 and stores the subscriber's finalized will in the subscriber's account at 350. If the system determines at 348 that attorney review of the will is needed, the will is transmitted to the designated law firm or attorney for review at 354. An attorney receiving the will reviews and assists with drafting the will, then works with the subscriber to finalize the will at 356. The finalized will may be retained by the law firm for storage in association with the subscriber's account at 358. Later, after the subscriber has passed away, the system may help enable execution of the subscriber's digital will, such as by delivering digital and/or physical content left to other subscribers to the private social network by the will.

The skilled artisan will readily understand that each functional element discussed herein and the various embodiments of the method and system of the present invention may all be implemented via an app that is executable by a computing device.

The present invention should not be considered limited to the particular examples described above, but rather should be understood to cover all aspects of the invention. Various modifications, equivalent processes, as well as numerous structures to which the present invention may be applicable will be readily apparent to those of skill in the art to which the present invention is directed upon review of the present specification.

What is claimed is:
1. A method for preparing a digital will, comprising:
providing a private social network operating on a system that comprises:
a cloud-based server having a memory and programmed instructions stored therein,
a plurality of computing devices in operative connection and communication with the cloud-based server, each computing device in the plurality comprising a display, a processor and a memory, wherein the computing device is configured to access the memory and the programmed instructions stored in the cloud-based server and execute at least some of the programmed instructions;
enabling a user to subscribe to the private social network to become a subscriber,
wherein the private social network comprises other subscribers who can execute the programmed instructions using a computing device in the plurality of computing devices, the private social network further comprising a private circle comprising the subscriber and some of the other subscribers to the private social network, wherein the private circle is configured to include both current subscribers and future subscribers identified by a relationship with the subscriber;
wherein the subscriber accesses the programmed instructions with a computing device and actuates the accessed programmed instructions to perform:
providing a digital-will building user interface, wherein the subscriber accesses the digital-will building user interface to build the digital will by identifying any assets to be transferred, identifying one or more beneficiaries, and identifying one or more executors of the digital will, wherein each of the one or more beneficiaries and each of the one or more executors are all subscribers to the private social network and are also all within the private circle;
receiving information from the system regarding the one or more executors of the digital will selected by the subscriber and loading the received information into a body of the digital will;
receiving personal information from the subscriber and loading the received personal information into the body of the digital will;
determining whether the body of the digital will requires attorney review;

when the digital will requires the attorney review, transmitting the digital will to a designated law firm and/or attorney for review;

receiving a finalized digital will from the designated law firm and/or the attorney; and storing the finalized digital will within the private social network in association with the subscriber, wherein upon the subscriber's death, the identified assets are transferred to the one or more identified beneficiaries by the one or more executors, further wherein at least one of the identified beneficiaries is a future subscriber that is:

unborn at the time the subscriber accesses the digital-will building user interface to build the digital will;

subscribed to the private social network; and admitted to the private circle after the relationship with the subscriber is validated by at least two of the other subscribers that are subscribed to the private circle.

2. The method of claim 1, wherein the determining whether the body of the digital will requires attorney review comprises determining that the digital will does not require the attorney review, the method further comprising guiding the subscriber to finalize the digital will and storing the finalized digital will within the private social network in association with the subscriber.

3. The method of claim 1, further comprising determining, via the system, that the subscriber has passed away and delivering digital content and/or identified physical content to at least one designated recipient in the subscriber's digital will.

4. A method for preparing a digital will, comprising:

providing a private social network operating on a system that comprises:

a cloud-based server having a memory and programmed instructions stored therein, a plurality of computing devices in operative connection and communication with the cloud-based server, each computing device in the plurality comprising a display, a processor and a memory, wherein the computing device is configured to access the memory and the programmed instructions stored in the cloud-based server and execute at least some of the programmed instructions;

enabling a user to subscribe to the private social network to become a subscriber, wherein the private social network comprises other subscribers who can execute the programmed instructions using a computing device in the plurality of computing devices, the private social network further comprising a private circle comprising the subscriber and some of the other subscribers to the private social network, wherein the private circle is configured to include both current subscribers and future subscribers identified by a relationship with the subscriber;

wherein the subscriber accesses the programmed instructions with a computing device and actuates the accessed programmed instructions to perform:

providing a digital-will building user interface, wherein the subscriber accesses the digital-will building user interface to build the digital will by identifying any assets to be transferred, identifying one or more beneficiaries, and identifying one or more executors of the digital will, wherein each of the one or more beneficiaries and each of the one or more executors are all subscribers to the private social network and are also all within the private circle;

receiving information from the system regarding the one or more executors of the digital will selected by the subscriber and loading the received information into a body of the digital will;

receiving personal information from the subscriber and loading the received personal information into the body of the digital will;

wherein upon the subscriber's death, the identified assets are transferred to the one or more identified beneficiaries by the one or more executors, further wherein at least one of the identified beneficiaries is:

unborn at the time the subscriber accesses the digital-will building user interface to build the digital will;

subscribed to the private social network; and admitted to the private circle after the relationship with the subscriber is validated by at least two of the other subscribers that are subscribed to the private circle.

5. A method for preparing a digital will, comprising:

providing a private social network operating on a system that comprises:

a cloud-based server having a memory and programmed instructions stored therein, a plurality of computing devices in operative connection and communication with the cloud-based server, each computing device in the plurality comprising a display, a processor and a memory, wherein the computing device is configured to access the memory and the programmed instructions stored in the cloud-based server and execute at least some of the programmed instructions;

enabling a user to subscribe to the private social network to become a subscriber, wherein the private social network comprises other subscribers who can execute the programmed instructions using a computing device in the plurality of computing devices, the private social network further comprising a private circle comprising the subscriber and some of the other subscribers to the private social network, wherein the private circle is configured to include both current subscribers and future subscribers identified by a relationship with the subscriber;

wherein the subscriber accesses the programmed instructions with a computing device and actuates the accessed programmed instructions to perform:

providing a digital-will building user interface, wherein the subscriber accesses the digital-will building user interface to build the digital will by identifying any assets to be transferred, identifying one or more beneficiaries, and identifying one or more executors of the digital will, wherein each of the one or more beneficiaries and each of the one or more executors are all subscribers to the private social network and are also all within the private circle;

wherein upon the subscriber's death, the identified assets are transferred to the one or more identified beneficiaries by the one or more executors, further wherein at least one of the identified beneficiaries a future subscriber that is:

unborn at the time the subscriber accesses the digital-will building user interface to build the digital will;

subscribed to the private social network; and admitted to the private circle after the relationship with the subscriber is validated by at least two of the other subscribers that are subscribed to the private circle.

\* \* \* \* \*